United States Patent
Gerdes et al.

(10) Patent No.: US 10,425,271 B2
(45) Date of Patent: *Sep. 24, 2019

(54) TRANSPOSITIONAL MODULATION COMMUNICATIONS

(71) Applicant: TM IP Holdings, LLC, Tucson, AZ (US)

(72) Inventors: Richard C. Gerdes, Tucson, AZ (US); Daniel L. Hodges, Tucson, AZ (US); Quinn Colin McIntosh, Tucson, AZ (US)

(73) Assignee: TM IP Holdings, LLC, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/880,732

(22) Filed: Jan. 26, 2018

(65) Prior Publication Data

US 2018/0152332 A1 May 31, 2018

Related U.S. Application Data

(63) Continuation of application No. 15/486,750, filed on Apr. 13, 2017, now Pat. No. 9,882,762, which is a (Continued)

(51) Int. Cl.
*H04L 27/32* (2006.01)
*H04L 27/12* (2006.01)
(Continued)

(52) U.S. Cl.
CPC .......... *H04L 27/32* (2013.01); *H04L 27/0008* (2013.01); *H04L 27/122* (2013.01);
(Continued)

(58) Field of Classification Search
CPC ....... H04L 27/122; H04L 27/10; H04L 27/32; H04L 2027/0051; H04L 27/34; H04L 27/36; H03C 1/62
See application file for complete search history.

(56) References Cited

U.S. PATENT DOCUMENTS 3,968,486 A  7/1976 Gerdes
4,259,888 A  4/1981 Gross
(Continued)

FOREIGN PATENT DOCUMENTS

TW   201740714       11/2017
WO   WO2014145868 A1  9/2014
WO   WO2017189362 A1  11/2017

OTHER PUBLICATIONS

International Search Report and Written Opinion for International Application No. PCT/US2017/028923, dated Aug. 3, 2017, 6 pages.
(Continued)

*Primary Examiner* — Rahel Guarino
(74) *Attorney, Agent, or Firm* — Fish & Richardson P.C.

(57) ABSTRACT

Methods, systems, and apparatus, including computer programs encoded on a computer storage medium for receiving, by a first device, a first signal from a second device, the first signal including a carrier signal modulated with a first modulation signal. Detecting a frequency of the carrier signal by performing a carrier extraction (CAREX) process on the first signal. Adding a second modulation signal to the carrier signal of the first signal to produce a combined signal, wherein the second modulation signal is a transpositional modulation (TM) signal and the first modulation signal is a non-TM signal. Transmitting the combined signal.

20 Claims, 14 Drawing Sheets

Related U.S. Application Data continuation of application No. 15/139,214, filed on Apr. 26, 2016, now Pat. No. 9,628,318.

(51) Int. Cl.
  *H04L 27/36* (2006.01)
  *H04L 27/00* (2006.01)
  *H04L 27/34* (2006.01)
  *H04L 27/10* (2006.01)
  *H04L 27/18* (2006.01)

(52) U.S. Cl.
  CPC ............ *H04L 27/345* (2013.01); *H04L 27/36* (2013.01); *H04L 27/10* (2013.01); *H04L 27/18* (2013.01); *H04L 2027/0051* (2013.01)

(56) References Cited

U.S. PATENT DOCUMENTS

| | | | |
|---|---|---|---|
| 4,301,415 A | 11/1981 | McFayden | |
| 4,318,055 A | 3/1982 | Hopwood | |
| 4,342,245 A | 8/1982 | Gross | |
| 4,613,974 A | 9/1986 | Vokac | |
| 4,680,633 A | 7/1987 | Gerdes | |
| 4,803,705 A | 2/1989 | Gillingham | |
| 4,989,219 A | 1/1991 | Gerdes | |
| 5,021,786 A | 6/1991 | Gerdes | |
| 5,124,706 A | 6/1992 | Gerdes | |
| 5,155,672 A | 10/1992 | Brown | |
| 5,165,017 A | 11/1992 | Eddington | |
| 5,184,218 A | 2/1993 | Gerdes | |
| 5,200,715 A | 4/1993 | Gerdes | |
| 5,200,822 A | 4/1993 | Bronfin | |
| 5,214,789 A * | 5/1993 | George | H04W 72/044 455/439 |
| 5,327,237 A | 7/1994 | Gerdes | |
| 5,511,100 A | 4/1996 | Lundberg | |
| 5,557,333 A | 9/1996 | Jungo | |
| 5,751,245 A * | 5/1998 | Janky | G01S 5/0027 340/993 |
| 6,112,152 A * | 8/2000 | Tuttle | G07B 15/063 340/5.61 |
| 6,522,697 B1 | 2/2003 | Spickermann | |
| 6,559,757 B1 | 5/2003 | Deller | |
| 6,788,154 B2 | 9/2004 | Maneatis | |
| 7,647,908 B1 * | 1/2010 | Biondo | F02D 28/00 123/179.2 |
| 7,856,050 B1 | 12/2010 | Wiss | |
| 8,537,952 B1 | 9/2013 | Arora | |
| 9,014,293 B2 | 4/2015 | Gerdes | |
| 9,338,042 B1 | 5/2016 | Gerdes | |
| 9,473,983 B1 | 10/2016 | Gerdes | |
| 9,628,318 B1 * | 4/2017 | Gerdes | H04L 27/122 |
| 9,882,762 B2 | 1/2018 | Gerdes | |
| 9,947,027 B2 * | 4/2018 | Smereka | H04W 4/021 |
| 2003/0071684 A1 | 4/2003 | Noori | |
| 2003/0142741 A1 | 7/2003 | Hartmann | |
| 2004/0247041 A1 | 12/2004 | Biedka | |
| 2004/0252531 A1 | 12/2004 | Cheng | |
| 2005/0065901 A1 | 3/2005 | Diong | |
| 2005/0200391 A1 | 9/2005 | Steinbach | |
| 2006/0006914 A1 | 1/2006 | Fan | |
| 2006/0197564 A1 | 9/2006 | Yen | |
| 2007/0041485 A1 | 2/2007 | Chang | |
| 2011/0043039 A1 | 2/2011 | Mancebo | |
| 2012/0171963 A1 | 7/2012 | Tsfaty | |
| 2014/0269969 A1 | 8/2014 | Gerdes | |
| 2015/0023456 A1 | 1/2015 | Vann | |
| 2017/0310526 A1 | 10/2017 | Gerdes | |

OTHER PUBLICATIONS

EP Extended European Search Report in European Application No. EP17790154, dated Apr. 5, 2019, 7 pages.

* cited by examiner

TRANSPOSITIONAL MODULATION COMMUNICATIONS

CROSS REFERENCE TO RELATED APPLICATIONS

This application is a continuation application of U.S. patent application Ser. No. 15/486,750, filed on Apr. 13, 2017, which is a continuation application of U.S. patent application Ser. No. 15/139,214, filed on Apr. 26, 2016, now U.S. Pat. No. 9,628,318, which are hereby incorporated by reference in their entirety.

BACKGROUND

Carrier modulation techniques are used to transmit information signals from one location to another. Traditional signal modulation techniques include, for example, amplitude modulation (AM), frequency modulation (FM), and phase modulation (PM). In addition, complex modulation techniques exist that incorporate aspects of AM, FM, and PM such as quadrature phase shift keying (QPSK), amplitude phase shift keying (APSK) and including quadrature amplitude modulation (QAM).

SUMMARY

This specification relates to methods and systems for combining transpositional modulation (TM) signals with traditional modulation (non-TM) signals. More specifically, the specification relates to methods and systems for receiving an existing non-TM signal and adding a TM signal to the carrier of the non-TM signal with minimal or no interference to the non-TM signal. In addition, the specification relates to methods and systems for communications between devices using a combined traditional modulation and TM signal on the same carrier signal. Although discussed in the context of TM, implementations of the present disclosure also may be applicable to other signal types.

In general, innovative aspects of the subject matter described in this specification can be embodied in methods that include the actions of receiving, by a first device, a first signal from a second device, the first signal including a carrier signal modulated with a first modulation signal. Detecting a frequency of the carrier signal by performing a carrier extraction (CAREX) process on the first signal. Adding a second modulation signal to the carrier signal of the first signal to produce a combined signal, where the second modulation signal is a transpositional modulation (TM) signal and the first modulation signal is a non-TM signal. Transmitting the combined signal. Other implementations of this aspect include corresponding systems, apparatus, and computer programs, configured to perform the actions of the methods, encoded on computer storage devices. These and other implementations can each optionally include one or more of the following features.

Some implementations include synchronizing a phase of the combined signal with a phase of the first signal.

In some implementations, adding the second modulation signal to the carrier signal includes modulating a third harmonic signal of the carrier signal of the first signal with data to produce the second modulation signal, and combining the second modulation signal with the first signal.

In some implementations, adding the second modulation signal to the carrier signal includes generating a second harmonic signal of the carrier signal and a third harmonic signal of the carrier signal. Modulating the third harmonic signal with a data signal. Mixing the modulated third harmonic signal with the second harmonic signal to produce the second modulation signal. And, combining the second modulation signal with the first signal. Some implementations include synchronizing a phase of the second modulation signal with a phase of the first signal.

In some implementations, the first modulation signal is one of phase modulation, frequency modulation, binary phase shift keying, quadrature phase-shift keying, amplitude modulation, or quadrature amplitude modulation.

In some implementations, detecting a frequency of the carrier signal includes detecting a center frequency of the first signal. Detecting a frequency of a third signal. Determining a difference signal between the center frequency of the first signal and the frequency of the third signal. And, modifying the frequency of the third signal based on the difference signal to provide the carrier signal.

In another general aspect, innovative aspects of the subject matter described in this specification can be embodied in a communication device that includes one or more processors, a receiver coupled to the one or more processors, a transmitter coupled to the one or more processors, and a data store coupled to the one or more processors. The data store includes instructions stored thereon which, when executed by the one or more processors, causes the one or more processors to perform operations including receiving a first signal from a second device, the first signal including a carrier signal modulated with a first modulation signal. Detecting a frequency of the carrier signal by performing a CAREX process on the first signal. Adding a second modulation signal to the carrier signal of the first signal to produce a combined signal, where the second modulation signal is a TM signal and the first modulation signal is a non-TM signal. Transmitting the combined signal. This and other implementations can each optionally include one or more of the following features.

In some implementations, the device is a portable device. In some implementations, the device includes a power source. In some implementations, the power source can be one of a battery or a solar power source.

Particular implementations of the subject matter described in this specification can be implemented so as to realize one or more of the following advantages. Implementations may increase the bandwidth of signals transmitted using traditional modulation schemes. Implementations may increase the data capacity for communication channels. Implementations may permit the combination of two differently modulated signals on a single carrier frequency. Some implementations may permit extraction of carrier signals from a modulated signal with little or no a priori information about the modulated signal. Some implementations may be capable of extracting a carrier from a modulated signal without regard to the type of modulation used in the modulated signal. In other words, some implementations may able to extract carrier signals while being agnostic to the type modulation of an input signal.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
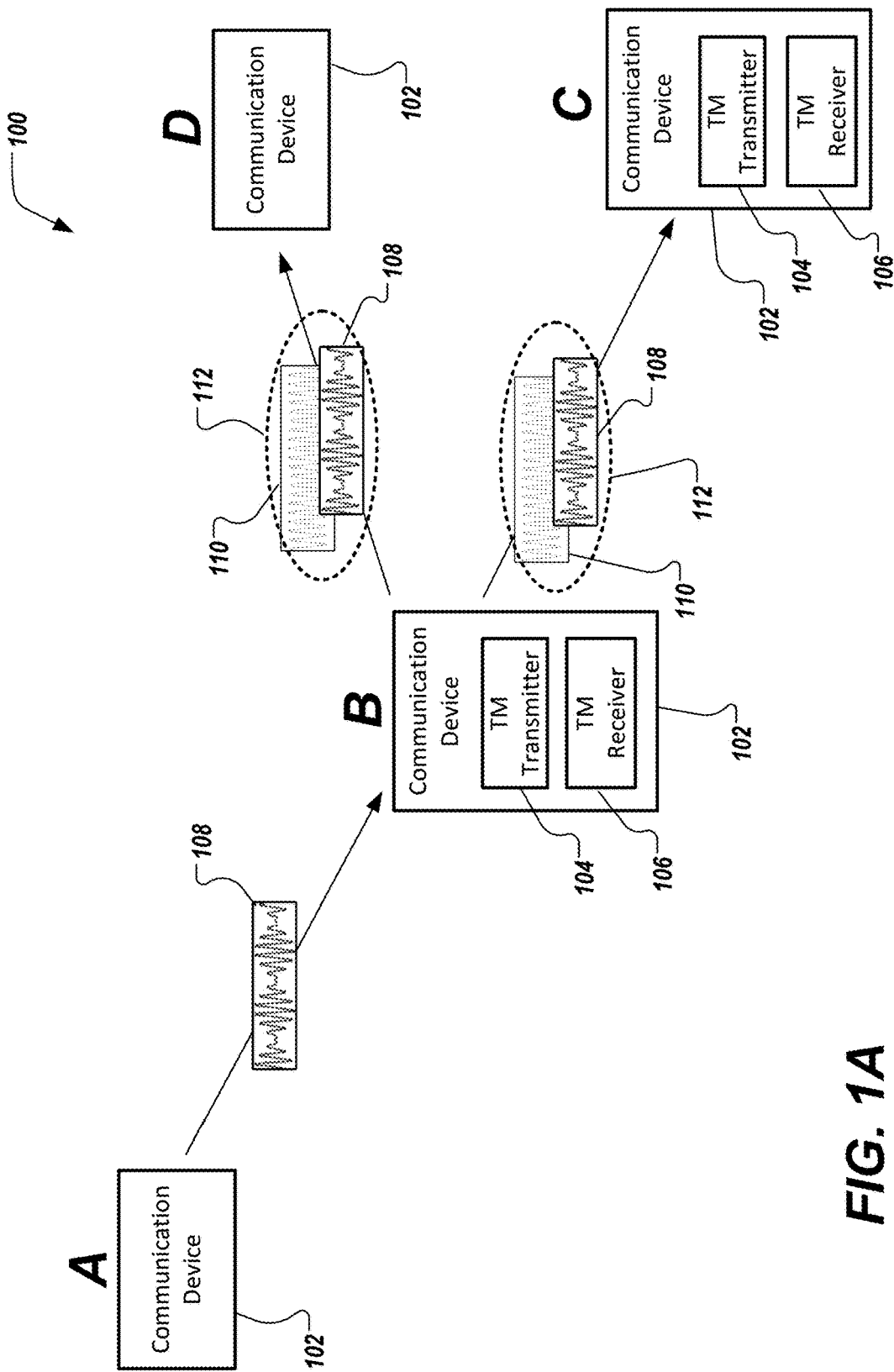
FIGS. 1A-1C depict example systems in accordance with implementations of the present disclosure.

This specification relates to methods and systems for combining transpositional modulation (TM) signals with traditional modulation (non-TM) signals. More specifically, the specification relates to methods and systems for receiving an existing non-TM signal and adding a TM signal to the carrier of the non-TM signal with minimal or no interference to the non-TM signal. In addition, the specification relates to methods and systems for communications between devices using a combined traditional modulation and TM signal on the same carrier signal. Although discussed in the context of TM, implementations of the present disclosure also may be applicable to other signal types.

Implementations of the present disclosure generally relate to methods and systems for combining TM signals with traditional modulation (non-TM) signals. More specifically, implementations provide methods and systems for receiving an existing non-TM signal and adding a TM signal to the carrier of the non-TM signal with minimal or no interference to the non-TM signal. For example, an existing non-TM signal can be received by a TM capable communication device. The communication device can extract the carrier signal from the non-TM signal, modulate the extracted carrier with additional data using a TM signal, and combine the TM signal with the received non-TM signal with minimal or no interference to the non-TM signal.

Other implementations of the present disclosure generally extract a carrier signal from an existing modulated signal, modulate the extracted carrier signal with a TM signal, and combine and retransmit the existing signal with the TM signal on the same carrier signal. Specifically, the implementations can extract a carrier frequency from a modulated signal in which the carrier signal has been suppressed (e.g., QPSK, QAM, APSK, BPSK). A CAREX (carrier extraction) circuit determines a frequency difference between the frequency of the CAREX output signal and a weighted average of the carrier frequency of the input signal. The calculated difference value is used to continuously tune a signal generator to maintain a minimal difference between the weighted average of the input carrier frequency and the CAREX output. The third harmonic of the extracted carrier is modulated with a data signal generating a TM modulated signal. The TM modulated signal is heterodyned back to the extracted carrier frequency and combined with the existing modulated signal. The combined signal can then be transmitted. Moreover, the TM modulated signal in the combined signal does not interfere with the existing signal because the TM modulation is not recognized by demodulation systems used to demodulate traditional modulation schemes. Instead, the TM signal appears as a slight increase in noise within the existing signal.

Other implementations of the present disclosure generally receive a combined traditional modulation and TM signal on the same carrier signal then separate the TM signal from the combined signal. Specifically, the implementations can separate the existing signal from a combined signal including a traditionally modulated signal (the existing signal) and a TM modulated signal. The existing signal can be demodulated from the carrier signal. An extracted carrier signal can be re-modulated with the demodulated existing signal to re-create the existing signal alone, absent the TM modulated signal. The re-modulated existing signal can be removed from the combined signal leaving only the TM modulated signal which can be demodulated using TM demodulation techniques described herein.

As used herein the terms "Transpositional Modulation," "TM modulation," "TM," and "TM signal" refer to a techniques of adding information to a carrier signal without affecting the amplitude, frequency or phase of the carrier signal (or a signal that is modulated according to such a technique). More specifically, for example, the above terms refer to a type of modulation in which information is conveyed by altering (e.g., transposing, time shifting) a harmonic of a carrier signal. For example, although the present disclosure is generally directed to producing Transpostional Modulation by altering the third harmonic of a carrier signal, in some implementations Transpostional Modulation can be produced by altering other harmonics of a carrier signal (e.g., a fourth harmonic, fifth harmonic, sixth harmonic, etc.). Furthermore, Transpositional Modulation and/or TM signals are not detectable by traditional demodulators, for example, those used for amplitude, frequency, or phase modulated signals.

FIG. 1A depicts an example system 100 in accordance with implementations of the present disclosure. The system 100 is a system of communication devices 102. The system 100 may be a radio frequency (RF) communication system, a satellite communication system, a landline communication system (e.g., a telephony or cable network), an optical communication system, a computer network, or any other system of communication devices 102. The communication devices 102 include systems for modulating a carrier signal with an information signal using traditional modulation techniques and transmitting and receiving the modulated signal from one communication device 102 to/from another. For example, communication device A may be a broadcast transmitter, communication device B may be a signal repeater, and communication devices C and D may be signal receives. Traditional modulation techniques include, for example, amplitude modulation (AM), frequency modulation (FM), and phase modulation (PM) in addition to complex modulation techniques that incorporate aspects of AM, FM, and PM such as quadrature phase shift keying (QPSK), amplitude phase shift keying (APSK) and including quadrature amplitude modulation (QAM). In addition, communication devices B and C include a TM transmitter 104 and a TM receiver 106. In some examples, communication device C may be, for example, a passive receiving device and may include a TM receiver 106 but not a TM transmitter 104. In some examples, a TM transmitter 104 and/or a TM receiver 106 can be integrated with traditional transmitters and receivers. The TM transmitter 104 and/or TM receiver 106 can be implemented as hardware devices (e.g., integrated circuits, chip-sets, application specific integrated circuits (ASIC), or field programmable logic arrays (FPGA)) or they can be implemented in software (e.g., as a software defined radio (SDR)).

The system 100 can receive a traditionally modulated signal 108 and combine the traditionally modulated signal 108 with a TM modulated signal 110 on the same carrier using a TM transmitter 104, thereby increasing the overall bandwidth of the combined signal 112. The TM modulated signal 110 can be separated from the combined signal 112 and demodulated by a TM receiver 106. Likewise, the traditionally modulated signal 108 can be separately demodulated with no interference caused by the TM modulated signal 110. This is possible because TM modulated signals are undecipherable by non-TM receivers, instead appearing as a slight increase of noise in traditionally modulated signals.

For example, communication device A may transmit a QAM signal 108 to communication device B. The TM transmitter 104 at communication device B can receive the QAM signal 108 and extract the carrier signal from the QAM signal 108. The TM transmitter 104 modulates the extracted carrier signal with a TM signal, combines the TM modulated signal 110 with the QAM signal 108, and retransmits the combined signal 112. In some examples, as described below, the TM transmitter 104 can extract a carrier signal from a traditionally modulated signal 108 (e.g., the QAM signal) in which the carrier is suppressed and while having little or no a priori information about the carrier signal (e.g., frequency or phase information).

Communication devices C and D receive the combined signal 112. The TM receiver 106 of communication device C separates and extracts the TM modulated signal 110 from the combined signal 112, and then demodulates the TM modulated signal 110 to obtain the TM modulated data signal. In some examples, as described below, the TM receiver 106 separates the TM modulated signal 110 from the combined signal 112 by demodulating traditionally modulated signal 108 (e.g., the QAM signal), re-modulating the carrier with only the traditionally modulated signal 108, and subtracting the re-modulated carrier signal from the combined signal 112 leaving only the TM modulated signal 110. On the other hand, communication device D, which does not have a TM receiver 106, will only detect and demodulate the traditionally modulated signal 108; not the TM modulated signal 110.

In some implementations, the carrier signal can be an intermediate frequency (IF) carrier signal. That is, the carrier signal is not necessarily at the same frequency of the carrier upon which the signal is ultimately be transmitted, but may be at an IF used internally within a system (e.g., a satellite communication system) as an intermediate step in either signal transmission or reception. That is, in the case of signal transmission, a system may up-convert a combined signal 112 from the IF signal to a transmission carrier frequency prior to transmitting the combined signal 112. Conversely, in the case of signal reception, a system may down-convert a modulated signal from the transmission carrier frequency to an IF frequency before separating the TM modulated signal 110 from the combined signal 112. In other implementations, an IF carrier signal may not be used, and the transmission carrier signal can be modulated with both a traditionally modulated signal and a TM modulated signal.

Figure 1B:
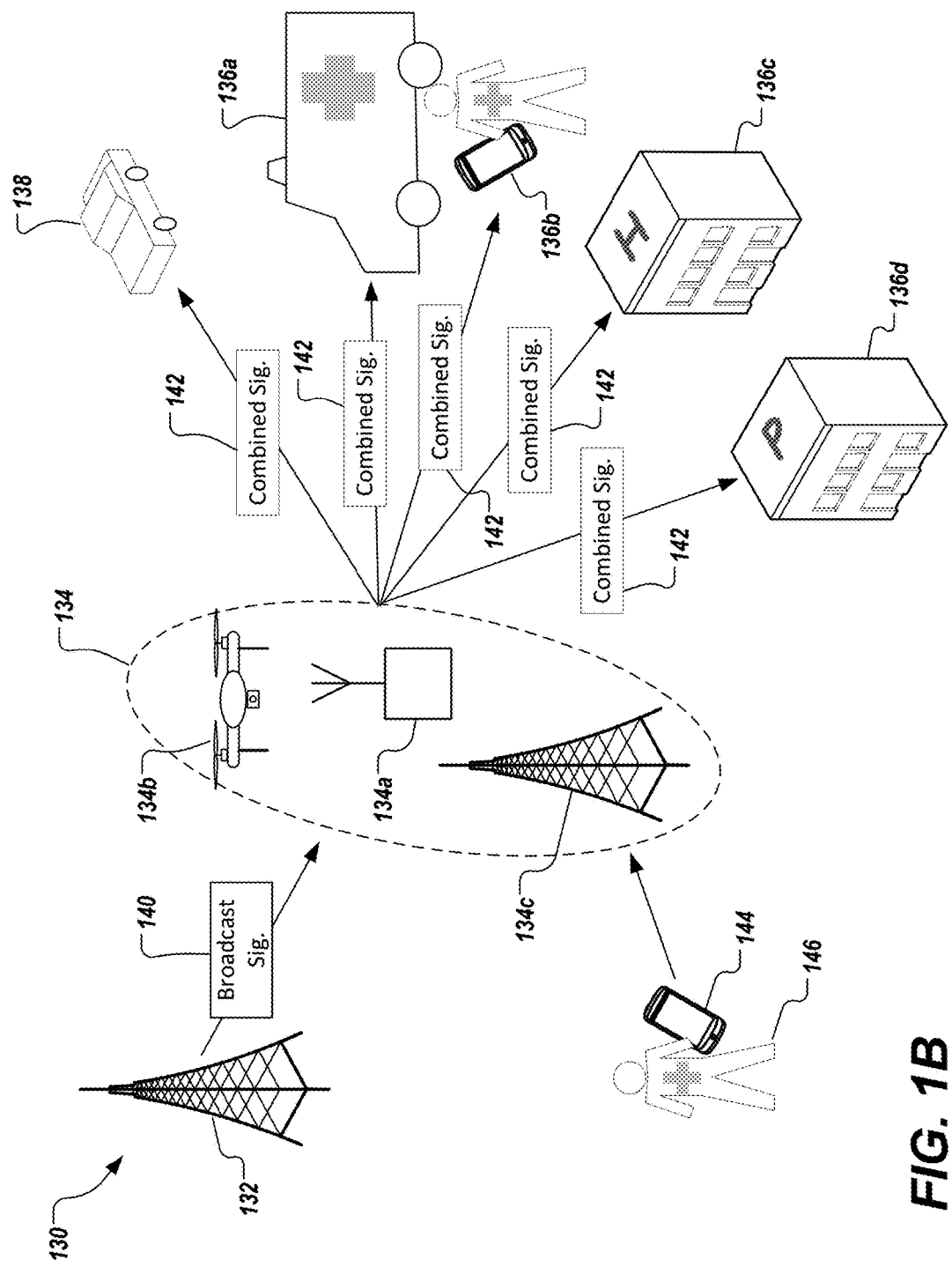

FIG. 1B depicts an example environment 130 for employing the techniques discussed above. The example environment is described in the context of a communication network for emergency response services (e.g., police, fire department, medical service personnel responding to an emergency situation such as a natural disaster). It is appreciated, however, that implementations of the present disclosure can be realized in other appropriate environments and contexts including, but not limited to, for example, computer networks, broadcast networks, cablecast networks, satellite systems, internet of things (IoT) networks, etc.

The environment 130 includes a broadcast signal source 132 (e.g., a broadcast transmitter), a TM capable repeater station 134, and multiple user communication devices 136a-136d, 138. The broadcast signal source 132 can be, for example, a transmitter that transmits a non-TM modulated signal (e.g., such as communication device A of FIG. 1A). For example, the broadcast signal source 132 can be an FM or AM radio transmitter, a television transmitter, cablecast transmitter, a cellular service transmitter, or a radio frequency (RF) communications transmitter (e.g., a high-frequency (HF) radio transmitter or repeater).

The user communication devices 136a-136d, 138 each include receivers for receiving one or more types of non-TM modulated signals from the broadcast signal source 134. For example, communication devices 136a-136d, 138 can include, AM, FM, or satellite radios, digital radios, software radios (e.g., software defined radios (SDR)), smart phones, tablet computers, televisions with broadcast or cablecast receivers, citizen band (CB) radios, etc. Communication devices 136a-136b are depicted as communication devices used by emergency service personnel. For example, communication device 136a represents a radio system in an emergency service vehicle. Communication device 136b represents a tablet computer used by emergency service personnel. For example, communication device 136b includes an SDR capable of receiving broadcast radio or televisions signals. Communication devices 136c, 136d represent communication systems in hospital or police dispatch centers or emergency action centers. For example, communication devices 136c, 136d can include broadcast/cablecast televisions systems, AM/FM/digital radio systems, and dispatch radio systems. In addition, communication devices 136a-136c each include a TM receiver (e.g., such as communication device C of FIG. 1A), and, in some examples, a TM transmitter. Communication device 138 does not include a TM receiver (e.g., such as communication device D of FIG. 1A) and represents a non-emergency services communication device (e.g., radio, television, smartphone, SDR, etc.).

The TM capable repeater station 134 includes both non-TM and TM transmitters and receivers (e.g., such as communication device B of FIG. 1A). Repeater station 134 can receive non-TM broadcast signals 140, create a combined signal 142 by adding TM signals to the same carrier as the non-TM signal, and transmit the combined signals 142 for reception by user communication devices 136a-136d, 138. As discussed above, communication devices 136a-136d will be capable of detecting and demodulating either or both the non-TM signals and the TM signals, while communication device 138 will only be capable of detecting and demodulating the non-TM signals.

The repeater station 134 can include, but is not limited to, a mobile repeater station 134a, an aerial repeater station 134b, and a fixed repeater station 134c. For example, a mobile repeater station 134a can be transportable such that it can be readily deployed at a disaster scene. In addition, a mobile repeater station 134a can include a local power source (e.g., a battery, solar power source, a power generator). For example, a mobile repeater station 134a can be implemented as a handheld device, a "suitcase sized" device, or a truck/trailer transportable device. The size of the mobile repeater station 134a may be determined by the electronics required to obtain the desired transmission power of the device and size of a power source required for the mobile repeater station 134a. An aerial repeater station 134b can include a repeater station that is attached to an aircraft or a drone. For example, an aerial repeater station 134b can be deployable above a disaster area. For example, a fixed repeater station 134c may be a primary entry point (PEP) station for an emergency alert system (EAS).

For example, during an emergency, the repeater station 134 can embed information for emergency services personnel into broadcast signals 140 from the broadcast signal source 132 using TM signals. The TM capable communication devices 136a-136d used by the emergency services personnel will be able to detect and receive the information in the TM signals, but non-TM capable communication devices 138 will not.

For example, during a large scale disaster (e.g., an earthquake) traditional communication channels can become overwhelmed and it may be difficult to get much needed information to first responders and dispatchers. When an emergency occurs, the TM capable repeater stations 134 can be used to provide additional communication channels for emergency service personnel without affecting the normal media content that is provided on existing channels (e.g. broadcast channels). For example, a repeater station 134 that is setup in response to an emergency can receive a broadcast signal 140 from a broadcast signal source 132. For example, the broadcast signal 140 may be a radio station signal that includes a normally scheduled radio program or a special news alert. The repeater station 134 can add information for emergency service personnel to the broadcast signal 140 without affecting the content contained in the non-TM broadcast signal 140. For example, the information added to the broadcast signal 140 can include but is not limited to, audio data, image data, text data, and video data. Furthermore, the repeater station 134 can distribute information to coordinate first responders (e.g., deployment instructions, locations of disaster scenes, routing information around blocked streets, etc.) and information to aid dispatchers (e.g., on scene status reports, aerial images or video of disaster scenes, e.g., from an aerial repeater station 134b) in the TM signals.

In some implementations, a mobile repeater station 134a can be setup at a disaster scene to distribute information from the scene. For example, a mobile repeater station 134a can be setup at the site of a collapsed roadway. The mobile repeater station 134a can be tuned to a local FM radio station (a broadcast signal 140). On site personnel 146 can use the mobile repeater station 134a to transmit images from the scene to a nearby dispatch center (e.g., a communication device 136c at a hospital and/or fire station) and to EMS teams (e.g., communication devices 136a, 136b) that are enroute to the scene. For example, the mobile repeater station 134a can receive data for transmission in TM signals from a communication device 144 at the scene. On site personnel 146 can capture images and/or video of the scene with a communicating device 144 (e.g., a smartphone or tablet computer) and transfer the images and/or video to the repeater station 134a. Communications between the on scene communication device 144 and the repeater station 134a need not use TM modulation, but can be accomplished using either non-TM signal or TM signals. Furthermore, the communications between the on scene communication device 144 and the repeater station 134a can be wired or wireless. The repeater station 134a receives the data (e.g., images and/or video) from the on scene communication device 144 and encodes the data in a TM signal that is added to FM radio station broadcast signal 140 to create a combined signal 142. The repeater station 134a then transmits the combined signal 142.

Each of the communication devices 136a-136d, 138 may receive the combined signal 142, but only TM capable communication devices 136a-136d will be able to detect and demodulate the TM portion of the combined signal 142. For example, the communication device 138, which is not TM capable, tuned to receive the broadcast signal 140 will detect only the broadcast signal 140 included in the combined signal 142. Thus, the TM signal containing information from the first responders will not affect the music or news report that a driver is listening to on communication device 138 (e.g., a car radio). At the same time, communication device 136c (e.g., a dispatch system at a hospital) will be able to detect and demodulate the TM portion of the combined signal 142. Thus, hospital personnel will be able to receive and view the images from the disaster scene. The hospital personnel can then, for example, make more informed decisions as to the type and extent of injuries that the first responders are dealing with. This information can also be used to aid in determining the number of additional first responders needed, the type of equipment needed, and how to prepare the hospital to receive the influx of patients. Moreover, such on scene information can be received from multiple mobile repeater devices 134a at multiple disaster scenes to help prioritize medical resources.

In another example implementation, an aerial repeater station 134b can be flown over a disaster scene and/or surrounding areas. As with the mobile repeater station 134a, the aerial repeater station 134b can be tuned to a local FM radio station (a broadcast signal 140). The aerial repeater station 134b can capture areal images or video of the scene for transmission in the TM portion of a combined signal 142. For example, the repeater station 134b can receive the aerial data (e.g., images and/or video) from a camera on the aircraft and encode the data in a TM signal that is added to FM radio station broadcast signal 140 to create a combined signal 142. The repeater station 134b then transmits the combined signal 142. As noted above, each of the communication devices 136a-136d, 138 may receive the combined signal 142, but only TM capable communication devices 136a-136d will be able to detect and demodulate the TM portion of the combined signal 142.

In another example implementation, a fixed repeater station 134c can be used to send information to emergency service personnel. For example, a fixed repeater station 134c can be used in a manner similar to that discussed above in reference to the mobile repeater station 134a. For example, a fixed repeater station 134c can be tuned to a radio or television station that is transmitting an emergency broadcast signal 140 (e.g., an Emergency Alert System (EAS) message). The fixed repeater station 134c can receive additional information for emergency service personnel and encode the information for the emergency service personnel in a TM signal to be transmitted in a combined signal 142 along with the emergency broadcast signal 140. Communication devices 136c, 136d (e.g., televisions used in hospitals, fire stations, and police stations) can be equipped to detect and decode the TM signals. Thus, when an emergency broadcast signal is received such communication devices 136c, 136d can display not only the emergency broadcast signal 140 but also information pertinent to the emergency service personnel. For example, dispatch orders or blocked routes to a disaster scene can be included in the TM signals and presented to the emergency service personnel. In some implementations, for example if the fixed repeater station 134c is a PEP station for the EAS, the fixed repeater station 134c may not receive a broadcast signal 140 from a separate broadcast signal source 132, but can generate both the non-TM modulation signal for the emergency broadcast signal and the TM modulation signal for the information specific to the emergency service personnel. In other words, the fixed repeater station 134c may not add the TM signal to an existing non-TM broadcast signal, but can generate and transmit both the non-TM and TM portions of the combined signal 142.

Figure 1C:
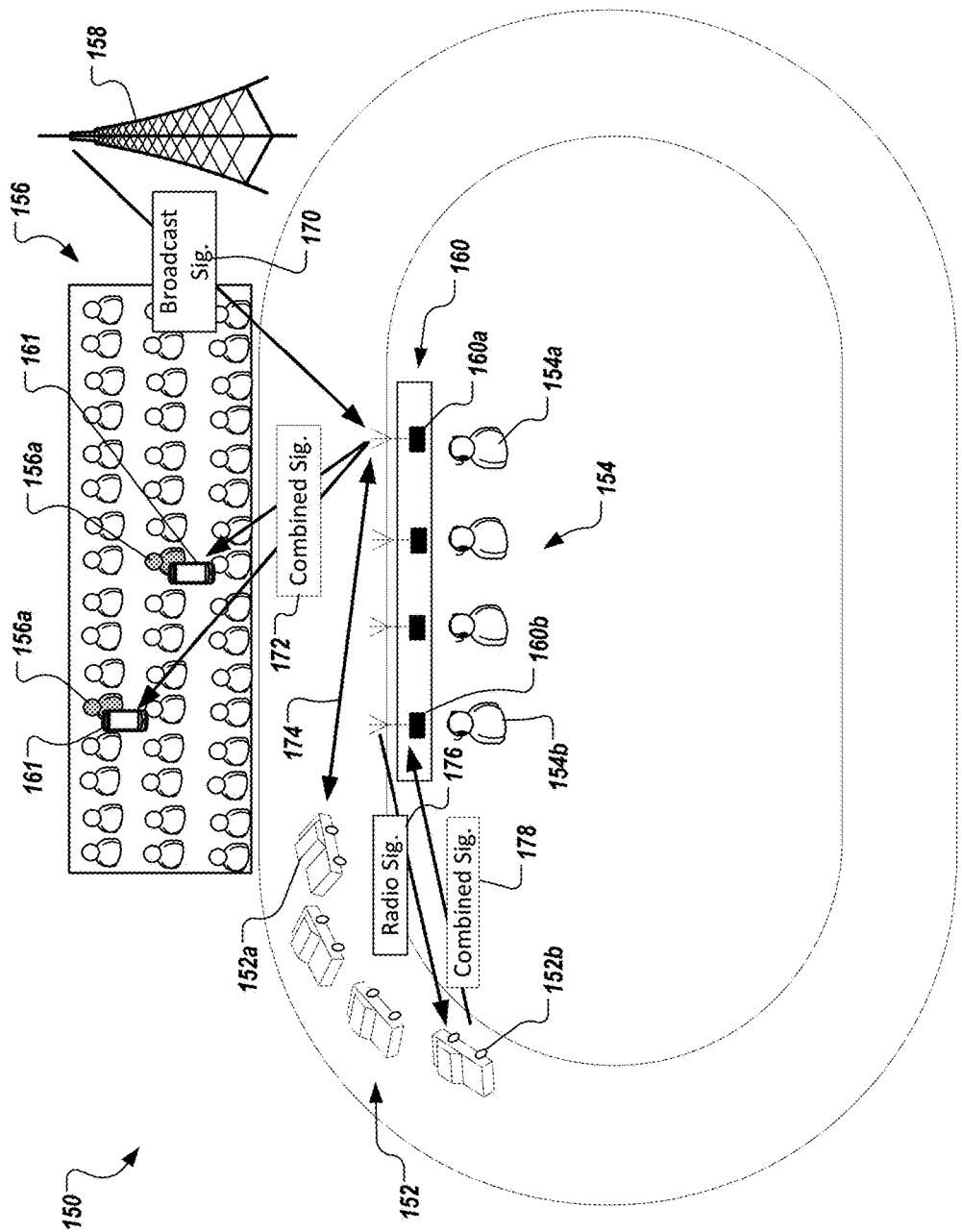

FIG. 1C depicts another example environment 150 for employing the techniques discussed above. The example environment is described in the context of a communication network for a sports venue (e.g., a racetrack). Again, it is appreciated that implementations of the present disclosure can be realized in other appropriate environments and contexts.

The environment 150 depicts several vehicles 152 each having communication equipment (e.g., radios), pit crews 154 with pit crew communication equipment 160, and race fans 156. In addition, the environment 150 depicts a broadcast signal source 158 (e.g., a broadcast transmitter). The broadcast signal source 158 can be, for example, a transmitter that transmits a non-TM modulated signal (e.g., such as communication device A of FIG. 1A). For example, the broadcast signal source 158 can be an FM or AM radio transmitter broadcasting the race at the race track.

In some implementations, a sports venue (e.g., racetrack, sports stadium or arena) can use TM capable devices to provide fans with unique entertainment experiences while watching a sporting event. For example, a racetrack may provide fans 156 with the opportunity to listen to communications 174 between their favorite driver and the driver's pit crew. For example, fans 156a can rent a TM capable receiver device 161 for use at the racetrack. The pit crew's 154a communication equipment 160a can include a TM capable transmitter and receiver. In accordance with the processes described above in reference to FIG. 1A, the communication equipment 160a can add the communications 174 between the driver of vehicle 152a and pit crew 154a to a broadcast signal 170 (e.g., a radio broadcast of the race). For example, the communication equipment 160a can encode the communications 174 in a TM signal and add the TM signal to the broadcast signal 170 to produce combined signal 172. Accordingly, only the TM capable receiver devices 161 will be able to detect and demodulate the TM signals containing the driver/pit crew communications 174. Thus, only fans 156a who rent the receiver devices 161 will be able to listen to the driver/pit crew communications 174.

In some examples, the TM capable receivers 161 can be implemented as a mobile application for execution on the fans' 156a mobile device (e.g., smartphone). For example, the TM capable receivers 161 can be implemented as SDRs. In some examples, the broadcast signal 170 may be a WiFi signal and the broadcast transmission source 158 can be WiFi access points within the sports venue. In such implementations, the TM signals including the driver/pit crew communications 174 can be added to the WiFi signal. For example, the communication equipment 160 can add the TM signals including the driver/pit crew communications 174 can be added to the WiFi signal. In some examples, the WiFi access points can include TM capable transmitters. For example, the driver/pit crew communications 174 can be sent through a computer network at the venue and the WiFi access points can encode the communications 174 in a TM signal and add the TM signal to the non-TM WiFi signals transmitted by the WiFi access point.

In another example implementation, a TM capable radio within a vehicle 152b (e.g., racecar) can be used to add information associated with the vehicle to the radio communications between the vehicle driver and a pit crew 154b. For example, using the processes described above in reference to FIG. 1A, a TM capable radio within a vehicle 152b can add a TM signal including the vehicle information to the radio communication signals 176 transmitted between the vehicle 152b and the pit crew's communication equipment 160b. For example, a TM capable radio can add a TM signal with vehicle diagnostic information to the carrier used for the radio signals 176 to produce the combined signal 178. The communication equipment 160b can also include a TM capable receiver to detect and demodulate the TM signals. Accordingly, the vehicles diagnostic information can be transmitted to the pit crew 154b without affecting the radio communications signals 176. For example, the communication equipment 160b can include a computer and a display for displaying the diagnostic information to the pit crew 154b. Vehicle diagnostic information can include, but is not limited to, engine data (e.g., temperatures, fluid levels, RPM), tire pressures, tire temperatures, break temperatures, a video feed from the vehicle, etc.

Although described in reference to racecars, TM signals and TM capable radios (e.g., communication radios or other types of signal transmitters/receivers) can be implemented to convey vehicle data in other contexts as well. For example, additional contexts can include, but are not limited to, shipping vehicles (e.g., trucks, trains, ships, aircraft), emergency service vehicles (e.g., law enforcement vehicles, ambulances, fire department vehicles), self-driving vehicles, agricultural vehicles (e.g., tractors and harvesting equipment such as combines), and traffic signal preemption systems (e.g., used by emergency service vehicles). In such contexts, the vehicle data can include location information (e.g., GPS data), vehicle identification, course, speed, cargo information, shipping origin, shipping destination, etc. Furthermore, TM cable vehicle radios can include, but are not limited to, communication radios (e.g., CB radios, bridge-to-bridge radios (ships)), automatic identification system (AIS) maritime transmitters, etc.

Figure 2:
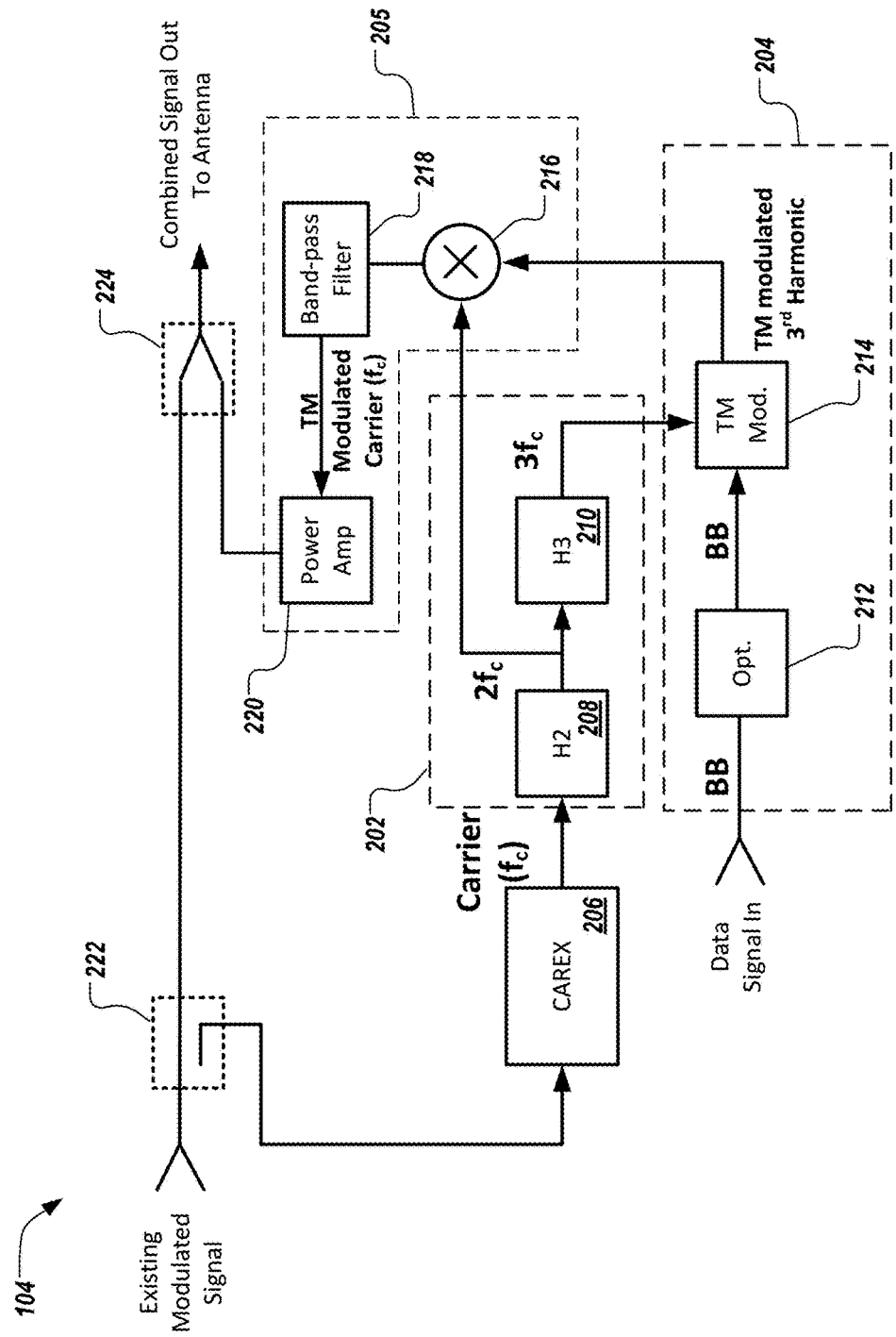
FIG. 2 depicts a block diagram of an example TM signal transmitter in accordance with implementations of the present disclosure.

FIG. 2 depicts a block diagram of an example TM signal transmitter 104 in accordance with implementations of the present disclosure. The TM transmitter 104 includes a carrier extraction portion (CAREX 206), a harmonic generation portion 202, a TM modulating portion 204, and a heterodyning portion 205. The carrier extraction portion includes the carrier extractor (CAREX) 206. The harmonic generation portion 202 includes a second harmonic generator 208 and a third harmonic generator 210. The TM modulating portion 204 includes a signal optimizer 212 and a TM modulator 214. And, the heterodyning portion 205 includes a signal mixer 216, a bandpass filter 218, and a power amplifier 220. In addition, the TM transmitter 104 includes a signal coupler 222 and a signal combiner 224.

In operation, the TM transmitter 104 receives an existing modulated signal (e.g., traditionally modulated signal 108 of FIG. 1). The signal coupler 222 samples the existing modulated signal and passes the sample of the existing modulated signal to the CAREX 206. The CAREX 206 extracts a carrier signal ($f_c$) from the existing modulated signal. The CAREX 206 is described in more detail below in reference to FIGS. 3A-4B. The output of the CAREX 206 is a pure sinusoidal signal at the fundamental frequency of the carrier from the existing modulated signal. In some examples, the CAREX 206 is agnostic to the type of modulation used in the existing modulated signal. That is, the CAREX 206 can extract the carrier signal from an existing modulated signal regardless of the type of modulation used in the existing modulated signal. In some examples, the CAREX 206 can extract carrier signals even when the carrier is suppressed in the existing modulated signal, and can do so with little or no a priori information about existing modulated signal's carrier (e.g., frequency or phase modulation information).

The CAREX 206 passes the extracted carrier signal to a second harmonic signal generator 208 and a third harmonic signal generator 210, which generate signals at the second and third harmonic frequencies ($2f_c$ and $3f_c$ respectively) of the fundamental carrier frequency ($f_c$). The second and third harmonic signals ($2f_c$, $3f_c$) are used by the TM modulation portion 204 and the heterodyning portion 205 of the TM transmitter 104 to generate a TM modulated signal and to heterodyne the TM modulated signal to the fundamental carrier frequency ($f_c$).

The TM modulation portion 204 of the TM transmitter 104 modulates the third harmonic ($3f_c$) of the carrier signal ($f_c$) with a data signal to generate the TM modulated signal. The TM modulated signal is then heterodyned to the frequency of the carrier signal ($f_c$), combined with the existing modulated signal, and outputted to an antenna for transmission.

In more detail, TM modulation portion 204 receives a data signal for transmission (e.g., a baseband (BB) data signal). The data signal is optionally processed for transmission as a TM modulated signal by the signal optimizer 212. In some examples, the signal optimizer 212 produces an optional pattern of inversion and non-inversion of the modulating signal, and filters the modulating signal to ensure that the total bandwidth of the data signal is within the channel bandwidth of the existing modulated signal. In some examples, the signal optimizer 212 can include sample-and-hold circuitry and filters to prepare the modulating signal for transmission as a TM modulated signal. In some examples, the signal optimizer 212 can be bypassed or turned off and on.

The TM modulator 214 modulates the third harmonic ($3f_c$) of the carrier signal ($f_c$) with a data signal to generate the TM modulated signal. For example, the TM modulator 214 modulates the third harmonic ($3f_c$) by introducing a variable time delay based on the data signal. In other words, the TM modulator 214 can use the data signal as a control signal for introducing an appropriate time delay to third harmonic ($3f_c$). As such, an amount of time delay introduced into the third harmonic ($3f_c$) represents discrete bits or symbols of the data signal. The described time delay modulation technique may be considered as time-shift modulation and is performed on the third harmonic ($3f_c$) of the intended carrier frequency ($3f_c$).

The time-shift modulation of the third harmonic ($3f_c$) produces a single set of upper and lower Bessel-like sidebands. The inventor has confirmed such results in laboratory simulations with an oscilloscope and spectrum analyzer. Moreover, the bandwidth of these sidebands can be limited to the bandwidth of an intended communication channel by the optimizer 212 before TM modulation of the signal, as described above.

In some examples, the time delay may be a phase shift. However, the time-shift modulation described above is not equivalent phase modulation. As noted above, the inventor has confirmed in laboratory tests that the time-shift modulation only produces a single pair of upper and lower Bessel-like sidebands. Phase modulation, however, produces a series upper and lower Bessel-like sidebands.

The heterodyning portion 205 prepares the TM modulation signal do be combined with the existing modulated signal and transmitted by the receiver. The TM modulated signal is then heterodyned (e.g., frequency shifted) by mixer 216 down to the fundamental frequency of the carrier signal ($f_c$). The mixer 216 multiplies the TM modulated signal with the second harmonic of the carrier ($2f_c$) which shifts the TM modulated signal to both the fundamental carrier signal frequency ($f_c$) and the fifth harmonic frequency of the carrier. The bandpass filter 218 removes signal at the fifth harmonic frequency as well as any additional signals or noise outside of the bandwidth of the TM modulated signal centered at the fundamental carrier signal frequency ($f_c$).

The TM modulated carrier signal is amplified by power amplifier 220 and combined with the existing modulated signal by the signal combiner 224. It may be necessary, in some examples, to adjust the phase of the TM modulated carrier signal to match the phase of the carrier in the existing modulated signal before combining the two signals and transmitting the combined signal.

Figure 3A:
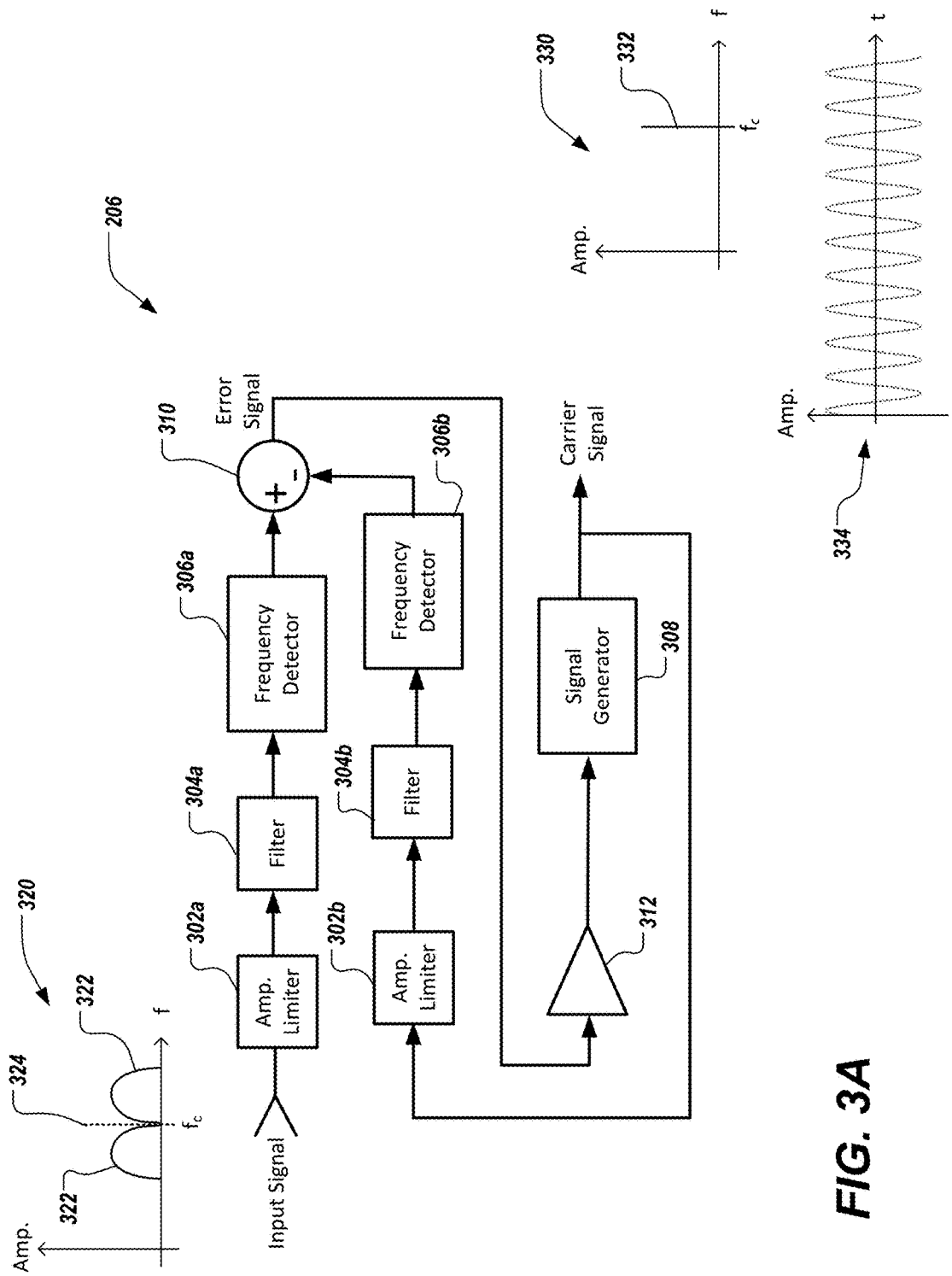
FIG. 3A depicts a block diagram of an example carrier extractor in accordance with implementations of the present disclosure.

FIG. 3A depicts a block diagram of an example CAREX 206 in accordance with implementations of the present disclosure. The CAREX 206 can be implemented as a circuit in a device such as a TM transmitter or TM receiver, for example. In some implementations, the CAREX 206 can be implemented as a standalone device for installation into in a larger system (e.g., an application specific integrated circuit (ASIC) or field programmable logic array (FPGA)). In some implementations, the CAREX 206 can be implemented in software, for example, as a set of instructions in a computing device or a digital signal processor (DSP).

The CAREX 206 operates by determining a center frequency of an input signal (e.g., either modulated or unmodulated), comparing the center frequency to the frequency of a pure sinusoidal signal produced by a signal generator to create a error signal, and adjusting the frequency of the signal generator output signal based on a control signal generated from the error signal until the error signal is minimized. Furthermore, the CAREX 206 does not require a priori information about a carrier signal to extract the carrier signal and can extract carrier signals when the carrier of the modulated signal is suppressed.

The CAREX 206 includes amplitude limiters 302a, 302b, filters 304a, 304b, frequency detectors 306a, 306b, signal generator 308, difference circuit 310, and an amplifier 312. The amplitude limiter 302a and filter 304a condition input signal before the input signal is analyzed by the first frequency detector 306a. The amplitude limiter 302a removes any variations in the amplitude of the input signal. In other words, the amplitude limiter 302a stabilizes the amplitude of the input signal. In some examples, the amplitude limiters 302a, 302b can be an analog comparator or an automatic gain control (AGC) circuit. The filters 304a, 304b are bandpass filters and removes extraneous signals (e.g., harmonics) and noise outside the channel bandwidth of the input signal.

The frequency detectors 306a and 306b can be frequency discriminators or quadrature detectors. The first frequency detector 306a detects the center frequency of the input signal. As shown in the frequency domain plot 320, an input signal produced by traditional modulation techniques generally has symmetric sidebands 322 located on either side of the carrier frequency 324. The frequency detector 306a can determine a center frequency of an input signal based on, for example, the frequencies of the outer edges of the sidebands 322. Furthermore, the frequency detector 306a can use the sidebands 322 of an input signal to determine the center frequency even if the carrier signal 324 is suppressed, as illustrated by the dotted line.

The signal generator 308 generates a pure sinusoidal signal (e.g., a single frequency signal) which is provided to a second frequency detector 306b. The signal generator 308 can be, for example, a voltage controlled oscillator (VCO) such as, but not limited to, a voltage controlled LC (inductor-capacitor) oscillator circuit, a voltage controlled crystal oscillator (VCXO), or a temperature-compensated VCXO. The second frequency detector 306b detects the frequency of the output signal from the signal generator 308. In some examples, the output signal from the signal generator 308 is provided to an amplitude limiter 302b and filter 304b before being transmitted to the second frequency detector 306b. The amplitude limiter 302b and filter 304b stabilize and filter the amplitude of the signal generator output signal similar to amplitude limiter 302a and filter 304a.

The output from each of the first and second frequency detectors 306a, 306b is provided as inputs to the differencing circuit 310. The output of both the first and second frequency detectors 306a, 306b can be, in some examples, a direct current (DC) voltage signal representing the center frequency of the input signal and the frequency of the signal generator 308 output signal, respectively. The output of the difference circuit 310 is a error signal representing the difference in frequency between the center frequency of the input signal in the signal generator output signal. The error signal (e.g., a DC voltage) is amplified by amplifier 312 and provided as a control signal to the signal generator 308. The amplifier 312 can be, for example, a high gain integrating circuit that integrates the inputted error signal over time to produce the control signal.

The signal generator 308 adjusts the frequency of its output signal based on the control signal until the frequency of the signal generator 308 output is matched to the center frequency of the input signal. The DC value of the control signal is used to control the frequency of the signal generator output, as shown in FIG. 4B and described below. The signal generator output is provided as the output of the CAREX 206. Frequency domain plot 330 and time domain plot 334 represent an example CAREX 206 output signal. As shown, the output signal of the CAREX 206 is a pure sinusoidal signal having a frequency 332 equivalent to the fundamental carrier frequency of the input signal.

In some implementations, the frequency detectors 306a and 306b are matched. In some examples, the matched frequency detectors 306a and 306b have similar frequency to DC output characteristics over changing modulated input frequencies. In some examples, the matched frequency detectors 306a and 306b have similar thermal and aging properties. In some examples, the amplitude limiters 302a and 302b, and the filters 304a and 304b are matched.

In some examples, when the error signal is minimized the signal generator output is effectively matched to the center frequency of the input signal. For example, the error signal can be considered as minimized when its magnitude is zero or substantially close to zero (e.g., when the control signal has a magnitude that is negligible in relation signal magnitudes measureable or usable by components of the CAREX 206). In some examples, the error signal is considered to be minimized when its magnitude is below a threshold value (e.g., an error tolerance threshold).

In some implementations, the CAREX 206 is adapted to extract carrier frequencies from single sideband signals. In some examples, the CAREX 206 includes a controller that offsets the output signal of the signal generator 308 by an appropriate offset frequency. For example, the output of the frequency generator 308 can be offset after it is fed back to the second frequency detector 306b, so as to not adversely affect the control signal. In some examples, the first frequency detector 306a can be configured to determine a frequency offset based on the bandwidth of the input signal. In such examples, the first frequency detector 306a can adjust the detected frequency by the frequency offset.

Figure 3B:
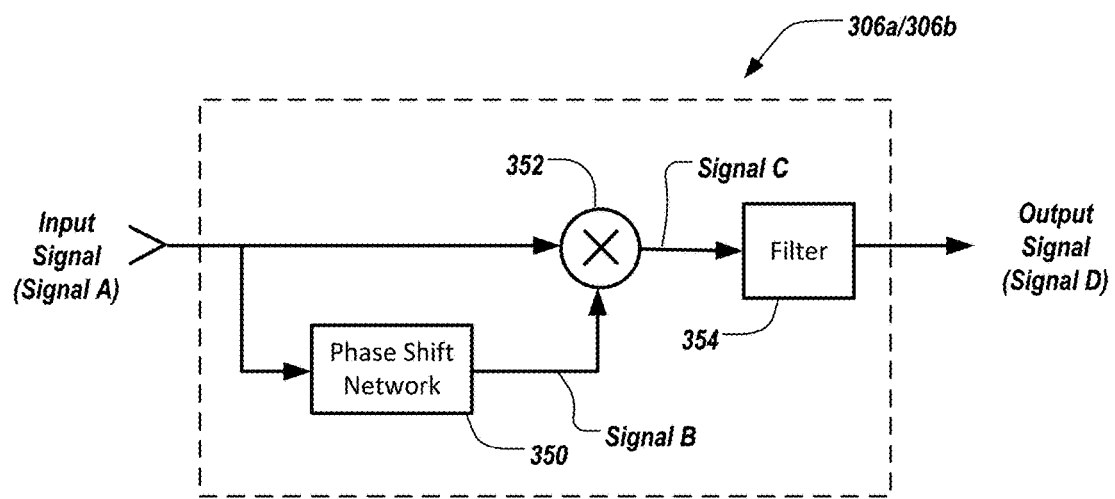
FIG. 3B depicts a block diagram of an example frequency detector in accordance with implementations of the present disclosure.
Figure 3B:
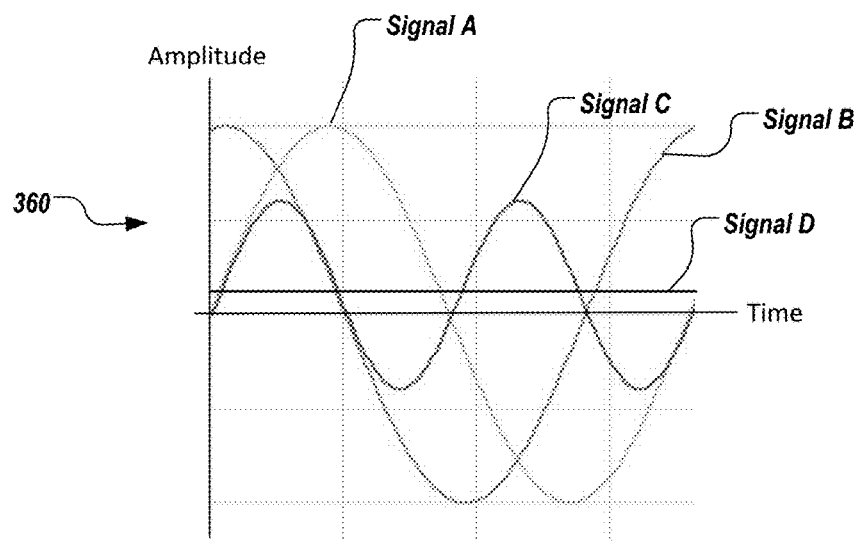

FIG. 3B is a block diagram of an example frequency detector 306 in accordance with implementations of the present disclosure. The frequency detector 306 illustrated in FIG. 3B is an example quadrature-based detector circuit. The frequency detector 306 includes a phase shift network 350, a signal mixer 352, and a filter 354. The phase shift network 350 is a frequency sensitive circuit, such as an all pass filter, for example, that causes a phase shift in an input signal that corresponds with the frequency of the input signal. In other words, the phase shift network 350 causes a change in the phase angle of the input signal relative to the frequency of the input signal. In some examples, the phase shift network 350 is tuned to produce a nominal phase shift of 90 degrees (e.g., quadrature to the input signal) for a nominal design frequency (e.g., a 70 MHz IF for a communication system).

The signal mixer 352 can be, for example, a signal multiplier. The signal mixer 352 receives the input signal and an output signal from the phase shift network 350 as inputs. The filter 354 is a low pass filter.

Plot 360 shows example signals at various points in the frequency detector 306. The input signal (Signal A) is passed to the phase shift network 350 and the signal mixer 352. Signal A is shown as a sinusoid for simplicity, however, Signal A can be a modulated signal. Signal B is the output of the phase shift network 350 and is phase shifted relative to the input signal (Signal A). The value of the phase shift corresponds to the frequency of Signal A, and is nominally 90 degrees for a design frequency. Deviations from the design frequency resulting in a phase shift of Signal B that deviates from the nominal 90 degrees. The input signal (Signal A) is mixed with the output of the phase shift network 350 (Signal B) to produce Signal C (e.g., Signal C=Signal A×Signal B). Signal C has a DC offset component corresponding to the phase difference between Signals A and B, and by extension, to the frequency of Signal A. The low pass filter 354 then removes the high frequency components of Signal C leaving only the DC component (Signal D). The deviation of Signal B's phase shift from the a nominal 90 degrees is exaggerated in plot 360 in order to clearly show the resulting DC output signal (Signal D).

Figure 4A:
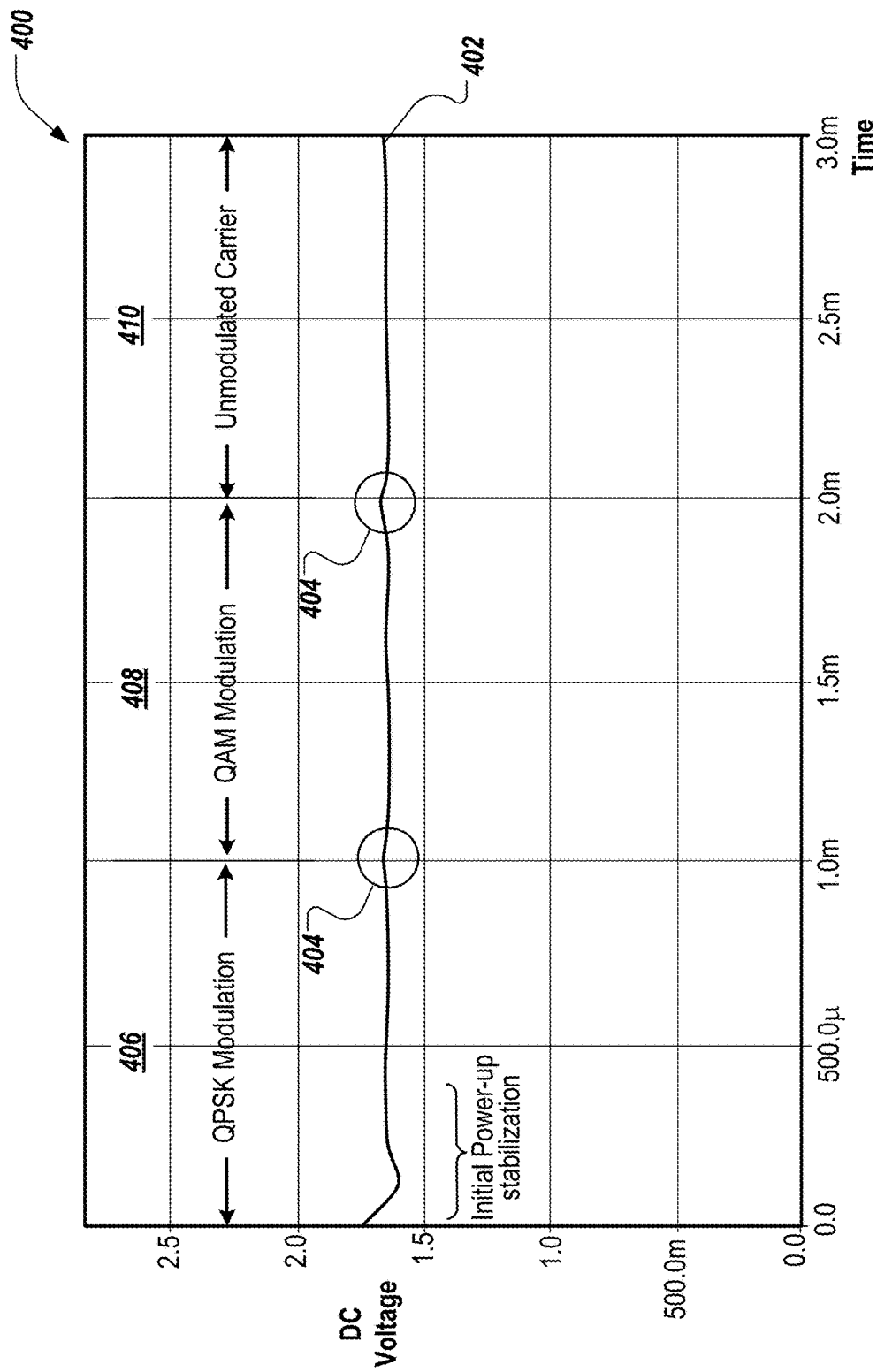
FIGS. 4A and 4B depict example control signals generated by a carrier signal extraction device.
Figure 4B:
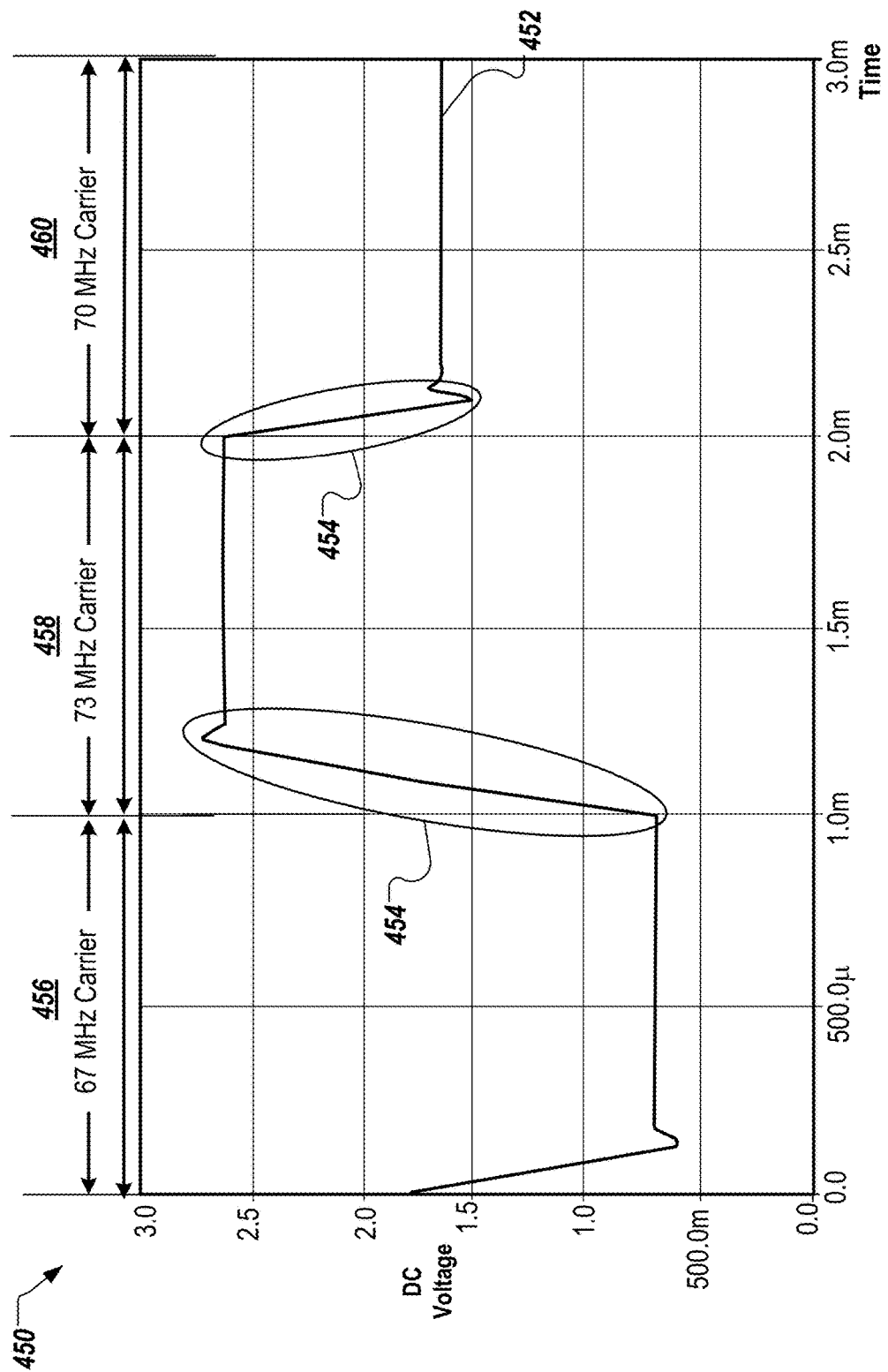

FIG. 4A depicts a plot 400 of an example control signal 402 generated in an example CAREX 206. The plotted control signal 402 is an example of the input signal to the signal generator 308 of FIG. 3A. The plotted control signal 452 is broken into several regions (406-410). The regions illustrate a variations 404 in the control signal 402 as the input signal to the CAREX 206 is switched between several different input signals, each modulated using a different type of modulation. The input signal in region 406 is a QPSK modulated signal. The input signal in region 408 is a QAM modulated signal. The input signal in region 410 is an unmodulated carrier signal. Each of the input signals in regions 406-410 is applied to a 70 MHz carrier. The plot 400 illustrates the robustness of the CAREX 206 and its adaptability to extracting carrier signals from various input signals without regard to the types of modulation applied to the carrier signal.

FIG. 4B depicts a plot 450 of another example control signal 452 generated in an example CAREX 206. The plotted control signal 452 is an example of the input signal to the signal generator 308 of FIG. 3A. The plotted control signal 452 is broken into several regions (456-460). The regions illustrate transitions 454 of the control signal 452 as the input signal to the CAREX 206 is switched between several different input signals, each having a different carrier frequency. The input signal in region 456 is a 67 MHz carrier signal. The input signal in region 458 is a 73 MHz carrier signal. The input signal in region 460 is a 70 MHz carrier signal. The plot 450 illustrates the robustness of the CAREX 206 and its adaptability to extracting different frequency carrier signals. In some implementations, as shown, the CAREX 206 loop can be designed for a specific center frequency (e.g., 70 MHz as shown). For example, the design center frequency can be a specific carrier frequency or IF of a communication system such as a satellite or radio frequency (RF) communication system, for example.

Figure 5:
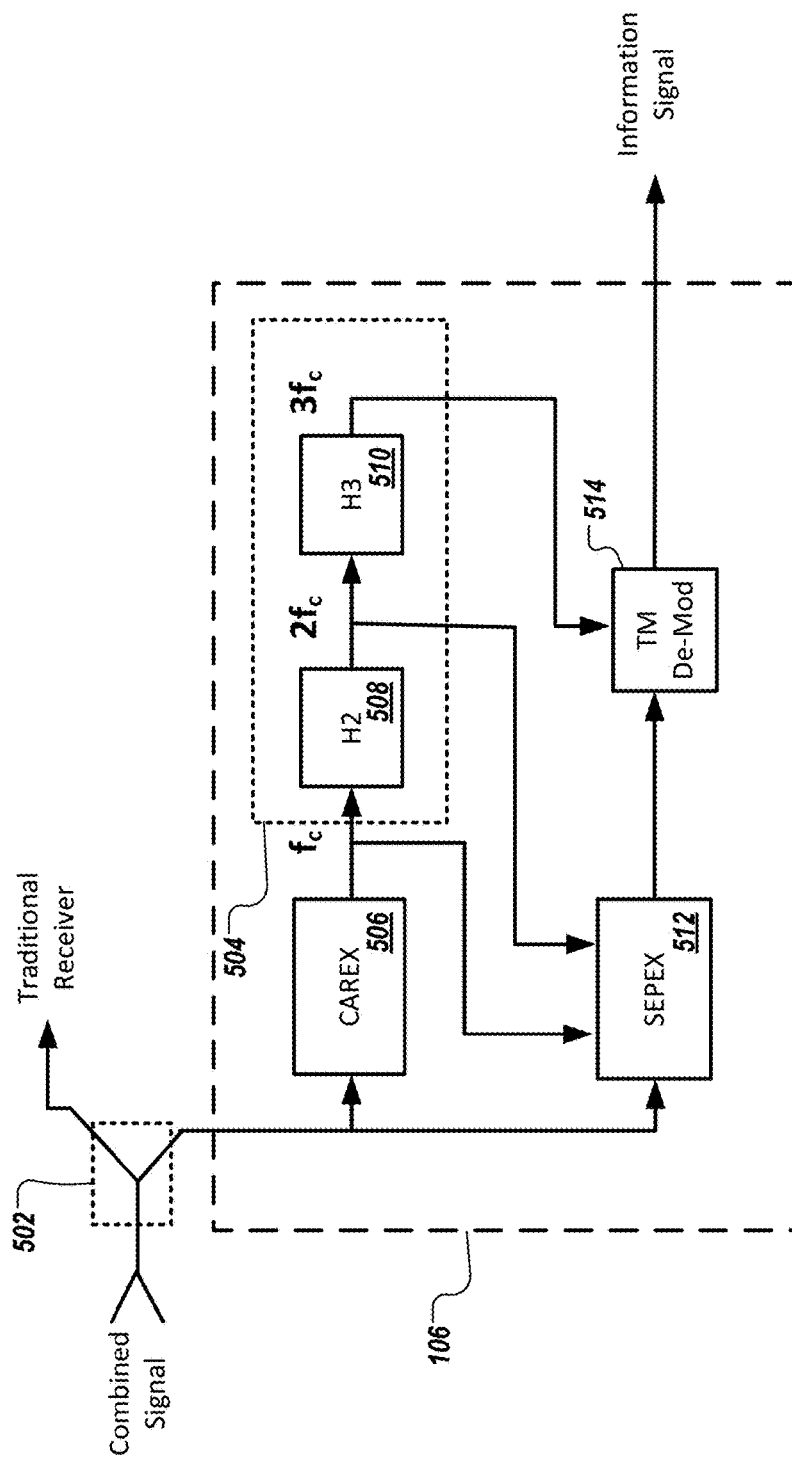
FIG. 5 depicts a block diagram of an example TM signal receiver in accordance with implementations of the present disclosure.

FIG. 5 depicts a block diagram of an example TM signal receiver 106 in accordance with implementations of the present disclosure. The TM receiver 106 includes a carrier extraction portion (e.g., CAREX 506), a harmonic generation portion 504, a signal separation and extraction portion (SEPEX) device 512, and a TM demodulator 514. As in the TM transmitter 104, the harmonic generation portion includes a second harmonic generator 508 and a third harmonic generator 510. In addition, the TM receiver 106 can include a signal splitter 502 to split a combined input signal (e.g. combined signal 112 of FIG. 1) between the TM receiver 106 and a signal receiver for traditional modulated signals.

In operation, the TM receiver 106 receives a combined input signal and provides the combined signal to both the CAREX 506 and SEPEX device 512. As described above in reference to the TM receiver 106, the CAREX 506 extracts a carrier signal ($f_c$) from the combined signal, and the second harmonic generator 508 and third harmonic generator 510, respectively, generate second and third harmonics ($2f_c$ and $3f_c$) of the extracted fundamental carrier frequency ($f_c$). Both the carrier signal ($f_c$) and second harmonic signal ($2f_c$) are provided to the SEPEX device 512. The third harmonic signal ($3f_c$) is provided to the TM demodulator 514.

The TM demodulation portion 504 separates and extracts the traditionally modulated signal from the combined signal to obtain the TM modulated signal. The SEPEX device 512 provides the TM modulated signal to the TM demodulator 514, which, demodulates the TM modulated signal to obtain a baseband data signal. The SEPEX device 512 separates and extracts the TM modulated signal from the combined signal. In some implementations, before outputting the TM modulated signal, the SEPEX device 512 heterodynes (e.g., up-shifts) the TM modulated signal to the third harmonic frequency ($3f_c$) for demodulation. The SEPEX device 512 is described in more detail below in reference to FIG. 6.

The TM demodulator 514 uses the third harmonic signal ($3f_c$) provided by the third harmonic generator 210 as a reference signal for TM demodulation. The TM demodulator 514 demodulates the TM signal by sensing the time shifts between TM modulated carrier signal from the SEPEX device 512 and the third harmonic signal ($3f_c$). In some examples, the TM demodulator 514 can be a phase detection circuit. In some implementations, the TM demodulator 514 detects the time shifts by determining a correlation between the TM modulated carrier signal and the third harmonic signal ($3f_c$) based on, for example, a product of the two signals.

Figure 6A:
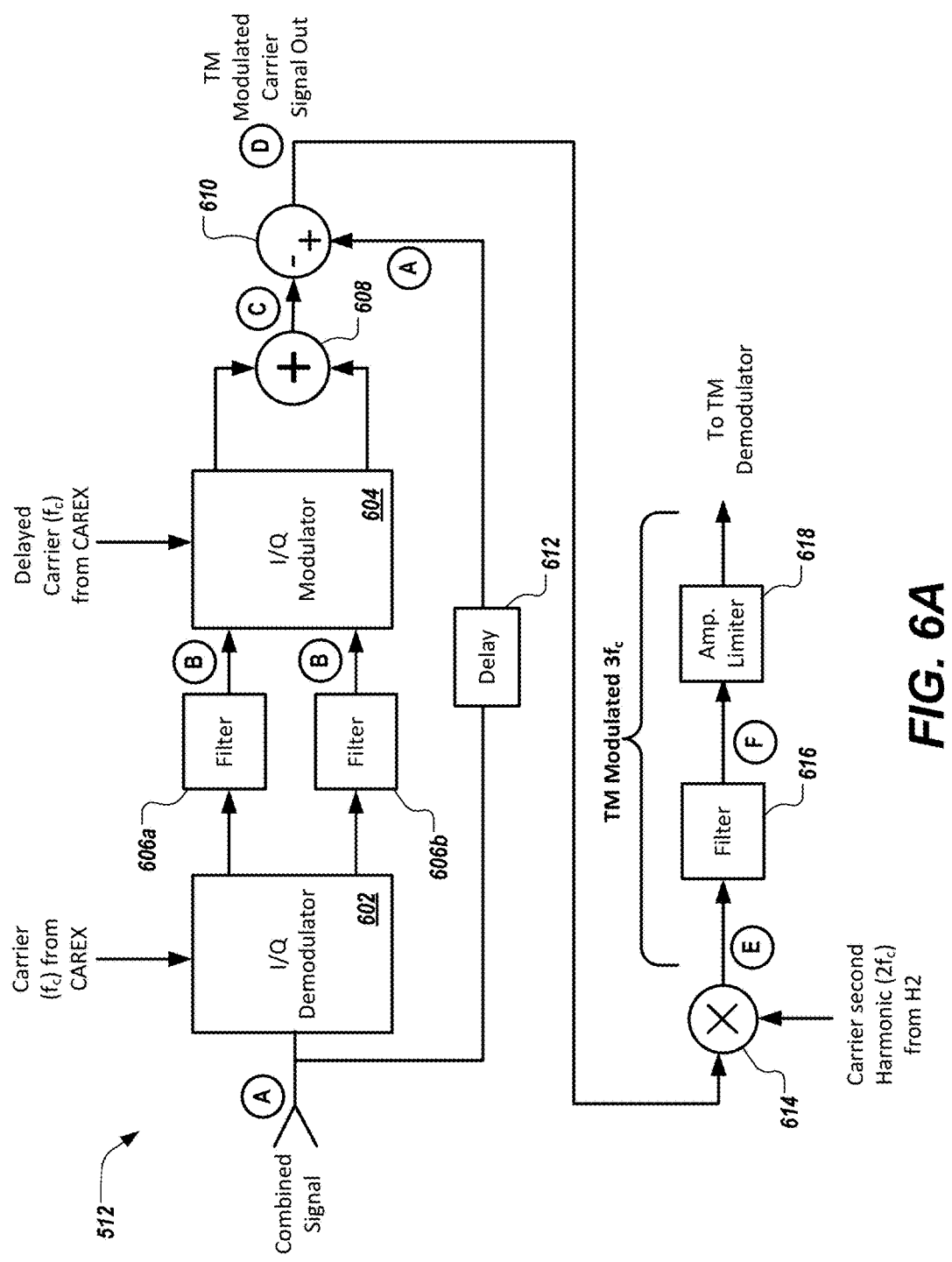
FIG. 6A depicts a block diagram of an example TM signal separation and extraction device in accordance with implementations of the present disclosure.

FIG. 6A depicts a block diagram of an example TM signal SEPEX device 512 in accordance with implementations of the present disclosure. The SEPEX device 512 can be implemented as a circuit in a device such as a TM receiver, for example. In some implementations, the SEPEX device 512 can be implemented as a standalone device for installation into in a larger system (e.g., an application specific integrated circuit (ASIC) or field programmable logic array (FPGA)). In some implementations, the SEPEX device 512 can be implemented in software, for example, as a set of instructions in a computing device or a digital signal processor (DSP).

In operation, the SEPEX device 512 demodulates the traditionally modulated signal from the combined signal. Because the TM modulation is not detected by traditional signal demodulation, the resulting signal does not include the TM signal, but only the demodulated data signal from the traditional modulation signal. A "clean" (e.g., un-modulated) carrier is then re-modulated with the previously demodulated data signal from the traditional modulation signal. The SEPEX 512 computes the difference between the combined signal and the re-modulated signal to obtain a TM modulated carrier signal. In other words, the SEPEX device 512 removes a traditionally modulated signal from the combined signal by demodulating the traditionally modulated signal, re-modulating a "clean" (e.g., un-modulated) carrier, and subtracting the re-modulated signal from the combined signal, thereby, leaving only the TM modulated carrier.

The SEPEX device 512 includes a signal demodulator 602, a signal modulator 604, low-pass filters 606a, 606b, a summing circuit 608, a difference circuit 610, a delay circuit 612, a mixer 614, a bandpass filter 616, and an amplitude limiter 618. The demodulator 602 is a non-TM signal demodulator, and the modulator 604 is a non-TM signal modulator. That is, the demodulator 602 and modulator 604 are traditional modulation type (e.g., AM, FM, PM, QAM, APSK, etc.) demodulator and modulator. The demodulator 602 and modulator 604 are depicted as a complex (e.g., quadrature and in-phase) demodulator and modulator, however, in some examples the demodulator 602 and modulator 604 can be a simple (e.g., single phase) demodulator and modulator.

Figure 6B:
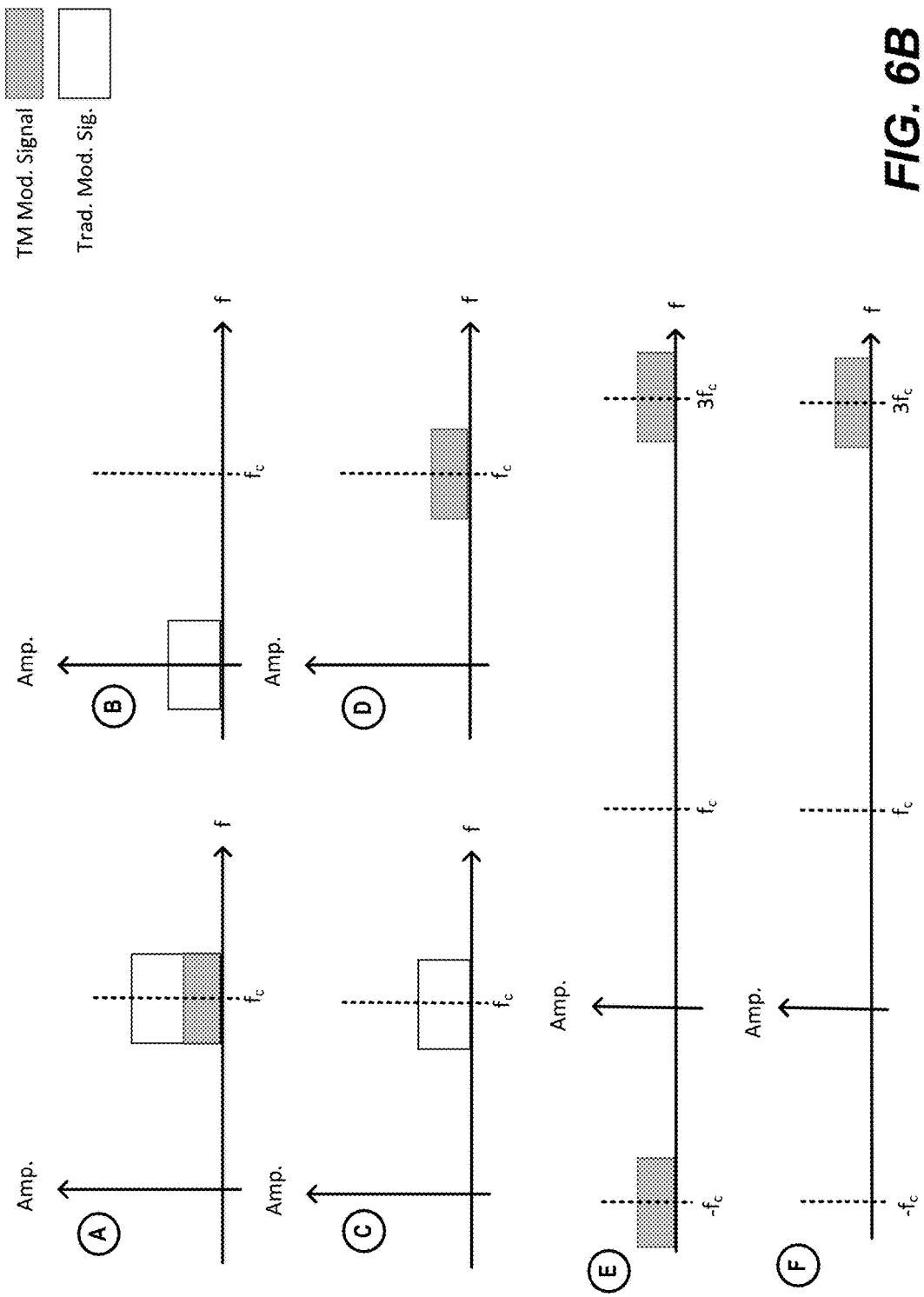
FIG. 6B depicts frequency domain representations of signals at various stages of the TM signal separation and extraction device shown in FIG. 6.

The operation the SEPEX device 512 is described below in more detail and with reference to FIGS. 6A and 6B. FIG. 6B depicts frequency domain representations of signals (A-F) at various stages of the SEPEX device 512. The demodulator 602 receives the combined signal (A) (e.g. combined signal 112 of FIG. 1) as one input, and the carrier signal ($f_c$) from the CAREX 506 as a second input. The combined signal includes both a traditionally modulated signal and a TM modulated signal. As shown by signal (A) in FIG. 6B, the combined signal includes frequency content from both the TM modulated signal and the traditionally modulated signal centered about the carrier frequency ($f_c$). The demodulator 602 demodulates the traditional modulated signal from the combined signal producing a baseband data signal. As noted above, because the TM modulation is not detected by traditional signal demodulation, the resulting baseband data signal does not include a TM signal.

In the case of complex modulation, the demodulator 602 demodulates both the in-phase and quadrature phase of the combined signal producing an in-phase and a quadrature phase baseband data signal. The low-pass filters 606a and 606b remove any extraneous signals or noise from the baseband data signals, for example, harmonics introduced by the demodulation process. The resulting baseband data signal, shown by signal (B), includes only the frequency content from the traditionally modulated signal centered at zero frequency (baseband). More specifically, a TM modulated signal does not exist at baseband, and thus, the TM modulated signal is removed by converting the traditionally modulated signal to baseband.

The modulator 604 receives the baseband data signals (e.g., in-phase and quadrature phase signals) as a first input, and the carrier signal ($f_c$) from the CAREX 506 as a second input. The modulator 604 re-modulates the un-modulated carrier signal ($f_c$) from the CAREX 506 with the baseband data signals resulting in re-modulated carriers (re-modulated in-phase and quadrature phase carriers) having only the traditionally modulated signal. The in-phase and quadrature phase re-modulated carriers are combined by the summing circuit 608 (signal (C)). FIG. 6B signal (C) shows the re-modulated signal again centered about the carrier frequency ($f_c$). In some examples, the carrier signal ($f_c$) may be phase shifted or delayed to account for delays introduced into the baseband data signals during the demodulation and filtering process. This is to ensure that the resulting re-modulated signal is in phase with the combined signal.

The re-modulated signal is subtracted from the combined signal by the difference circuit 610 removing the traditionally modulated signal from the combined signal. The resulting signal, show by signal (D), includes only the TM modulated carrier signal ($f_c$). The combined signal is delayed by the delay circuit 612 to account for delays introduced into the re-modulated signal by the demodulation and re-modulation process.

The TM modulated signal is heterodyned (e.g., up-shifted) to the third harmonic (3fc) by the mixer 614. The mixer 614 multiplies the TM modulated signal with the second harmonic ($2f_c$) of the carrier from the second harmonic generator 508 producing signal (E). Heterodyning the TM modulated carrier signal ($f_c$) with the second harmonic (2fc) shifts the TM modulated signal to both the third harmonic (3fc) and the negative carrier frequency (−fc) (e.g., a phase inverted version of the TM modulated signal at the carrier frequency). The bandpass filter 616 removes the phase inverted TM signal at the carrier frequency leaving only the TM modulated third harmonic (3fc) (signal (F)), and the optional amplitude limiter 618 removes any variations in the amplitude of the TM modulated third harmonic signal.

In some examples, the SEPEX device 512 can include multiple different types of demodulators 602 and modulators 604. For example, the SEPEX device 512 can include FM, PM, and QAM demodulators 602 and modulators 604. In such examples, the SEPEX device 512 can also include a control device that detects the type of traditional modulation on input signal, and sends the input signal to the appropriate set of demodulator and modulator.

Although the SEPEX device 512 is described in the context of separating and extracting a TM modulated signal from a traditionally modulated signal, in some implementations, the SEPEX device 512 can be modified to separate two traditionally modulated signals such as separating non-quadrature modulated signals (e.g., in-phase modulated signal) and quadrature modulated signals. For example, a non-quadrature modulated signal could be separated and extracted from a combined I/Q modulated signal by modifying the SEPEX device 512 shown in FIG. 6A such that only the quadrature modulated signal is demodulated and demodulated by demodulator 602 and modulator 604.

Figure 7:
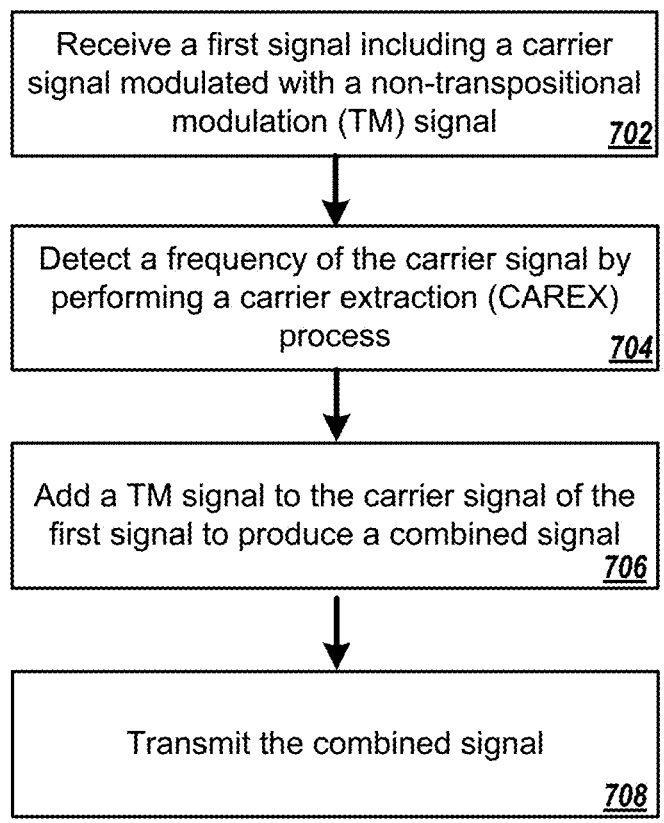
FIGS. 7-9 depict example processes that can be executed in accordance with implementations of the present disclosure.

FIG. 7 depicts an example process 700 for adding information to existing communication signals that can be executed in accordance with implementations of the present disclosure. In some examples, the example process 700 can be provided as computer-executable instructions executed using one or more processing devices (e.g., a digital signal processor) or computing devices. In some examples, the process 700 may be hardwired electrical circuitry, for example, as an ASIC or an FPGA device. In some examples, the process 700 may be executed by a software defined radio (SDR).

A first signal including a carrier signal modulated with a non-transpostional modulation (TM) signal is received (702). For example, the first signal can be a broadcast signal transmitted by a broadcast transmitter. For example, a broadcast signal can be an AM or FM radio signal, a broadcast or cable cast televisions signal, a satellite communication signal (e.g., a satellite television signal, a GPS signal). In some examples, the first signal is received by a communication device that includes both traditional and TM receivers and transmitters.

A frequency of the carrier signal is detected by performing a carrier extraction process (CAREX) on the first signal (704). For example, a CAREX process such as that described in reference to FIGS. 3A-4B and 8 can be performed on the first signal to extract the frequency of the carrier signal from the first signal.

A TM signal is added to the carrier signal of the first signal to produce a combined signal (706), and the combined signal is transmitted (708). The combined signal may be received by various different receivers, but only TM capable receivers will be able to detect that the TM signal is present in the combined signal. For example, the TM modulation signal can be used to carry specialized data for emergency service personnel. The TM signal can be used to expand the data rate through a given communications channel during an emergency situation. In some examples, the TM signal can be used to add supplementary information to communication signals.

In some implementations, a TM signal is added to a carrier signal by modulating a harmonic of the carrier signal (e.g., a third harmonic) with a data signal. The modulated harmonic is heterodyned to the frequency of the carrier signal. For example, the modulated harmonic can be heterodyned to the frequency of the carrier signal by mixing it with another appropriate harmonic (e.g., a second harmonic) of the carrier signal. In some examples, a harmonic of the carrier signal is modulated with data by transposing or time shifting the third harmonic to represent data from the data signal (e.g., data bits or symbols).

In some implementations, the phase of the first signal and the second signal are synchronized before generating the combined signal. For example, the phase of a TM modulated signal can be synchronized with that of a received non-TM signal before combining the two signals and transmitting the combined signal. In some examples, the phase of the carrier of the TM signal can be phase matched with the carrier signal of the non-TM signal before the two signals are combined.

Figure 8:
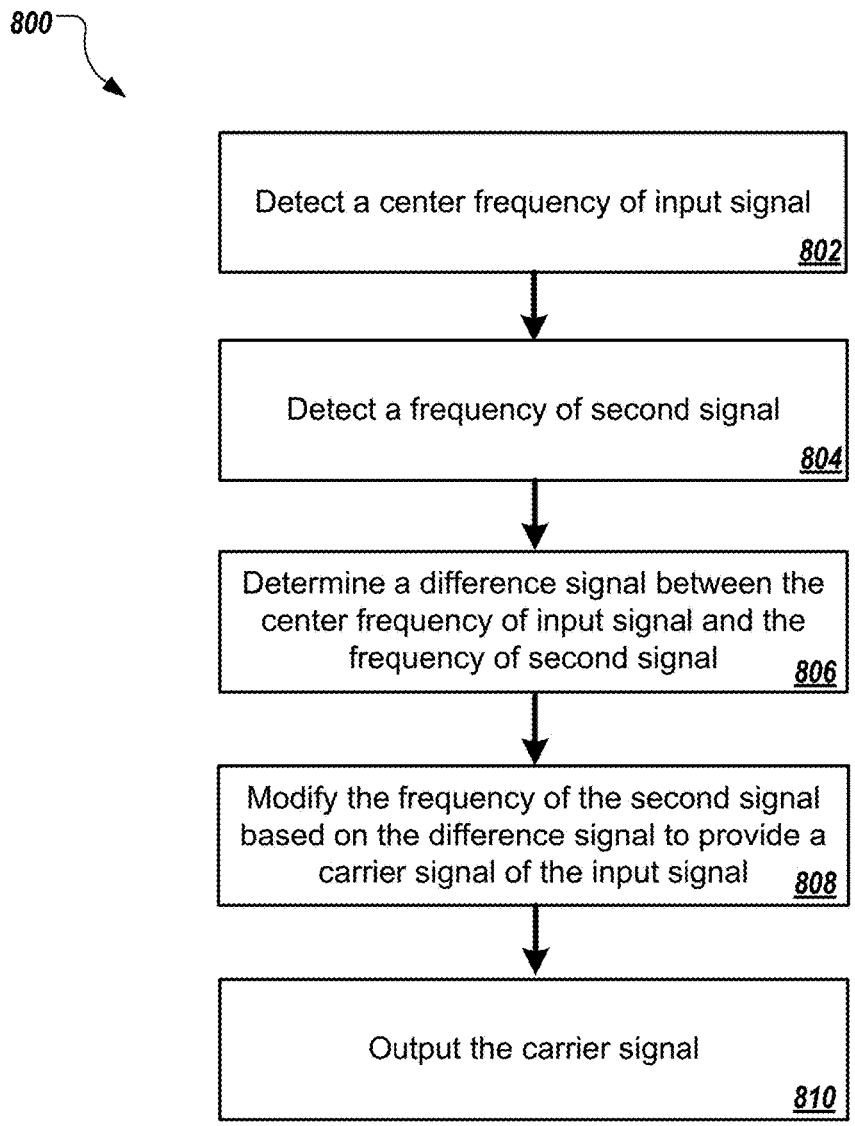

FIG. 8 depicts an example process 800 for extracting a carrier frequency from an input signal that can be executed in accordance with implementations of the present disclosure. In some examples, the example process 800 can be provided as computer-executable instructions executed using one or more processing devices (e.g., a digital signal processor) or computing devices. In some examples, the process 800 may be hardwired electrical circuitry, for example, as an ASIC or an FPGA device. In some examples, the process 800 may be executed by an SDR.

A center frequency of an input signal is detected (802). For example, the center frequency can be detected based on frequency side lobes of the input signal. In some examples, the input signal can include the carrier signal modulated with the modulation signal. In some examples, the input signal is a carrier signal modulated with a traditional modulation signal and a TM modulation signal. A frequency of a second signal is detected (804). For example, the second signal may be the output of a signal generator such as, for example, a VCO or a VCXO. A difference signal (e.g., control signal) is determined based on the center frequency of the input signal and the frequency of the second signal (806). For example, the difference signal represents a difference in frequency between the center frequency of the input signal and the frequency of the second signal. In some examples, difference signal is a DC voltage signal.

The frequency of the second signal is modified based on the difference signal to provide the carrier signal of the input signal (808), and the second signal is outputted as the carrier signal from the device performing the process 800 (810). For example, a difference signal can be a control signal for the signal generator and can cause the signal generator to adjust the frequency of its output signal. The frequency of the second signal modified until it is matched to the center frequency of the input signal. In some examples, the frequency of the second signal is matched to the center frequency of the input signal when the difference signal reaches a minimum value. In some examples, the minimum value may be a threshold value indicating that the difference between the frequency of the second signal in the center frequency of input signal is within an allowable tolerance. In some examples, the minimum value may be a magnitude of the different signal voltage that is below the threshold minimum voltage magnitude.

Figure 9:
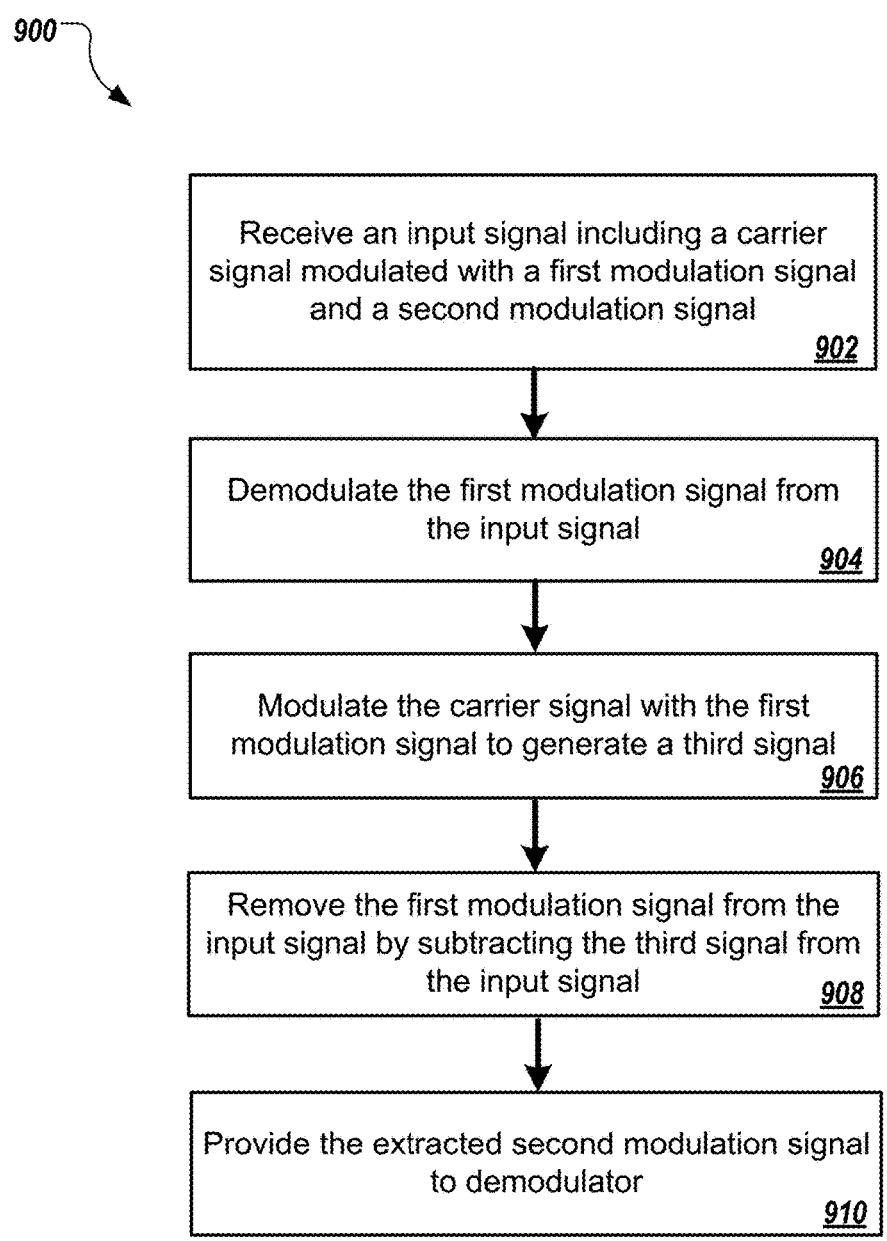

FIG. 9 depicts an example process 900 for separating TM signals from input signals that can be executed in accordance with implementations of the present disclosure. In some examples, the example process 900 can be provided as computer-executable instructions executed using one or more processing devices (e.g., a digital signal processor) or computing devices. In some examples, the process 900 may be hardwired electrical circuitry, for example, as an ASIC or an FPGA device. In some examples, the process 900 may be executed by an SDR.

An input signal including a carrier signal modulated with a first modulation signal and a second modulation signal is received 902). For example, the first modulation signal may be a traditional type of modulation signal such as, for example, FM, AM, PM, QAM, APSK, etc. The second modulation signal may be a TM modulation signal. The first modulation signal is demodulated from the input signal (904). For example, the first modulation signal can be demodulated using traditional the modulation techniques. Because traditional demodulation techniques do not recognize TM modulation, the resulting demodulated first modulation signal will not include the TM modulation signal.

The carrier signal is re-modulated using the demodulated first modulation signal to generate a third signal (906). For example, the third signal includes an un-modulated carrier signal modulated with the first modulation signal. The un-modulated carrier signal has the same frequency as the carrier of the input signal. The first modulation signal is removed from the input signal by subtracting the third signal from the input signal (908) to extract the second modulation signal (e.g., the TM modulation signal) from the input signal. In some examples, the input signal must be delayed an appropriate amount of time to ensure that it is in phase with the third signal. That is, due to the demodulation and re-modulation process the third signal may be out of phase with the original input signal. Thus, before subtracting the third signal from the input signal, the input signal can be delayed an appropriate amount of time. The extracted second modulation signal is provided to a signal demodulator (910). For example, an extracted TM modulated signal can be provided to a TM signal demodulator for demodulation.

While the present disclosure is generally directed to generating transpostional modulated signals and demodulating transpostional modulated signals using a third harmonic of a carrier signal, in some implementations transpostional modulated signals can be generated and demodulated by using other harmonics of a carrier signal (e.g., a fourth harmonic, fifth harmonic, sixth harmonic, etc.).

Implementations of the subject matter and the operations described in this specification can be realized in analog or digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any implementation of the present disclosure or of what can be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. An electronic communication device comprising:
a radio coupled to a computer system of a vehicle, the radio comprising:
a signal receiver, and
a signal transmitter,
wherein the radio is configured to perform operations comprising:
receiving a first signal from a second device, the first signal including a carrier signal modulated with a first modulation signal;
adding a second modulation signal to the carrier signal of the first signal to produce a combined signal, wherein the second modulation signal is a transpositional modulation (TM) signal and the first modulation signal is a non-TM signal, the second modulation signal including information associated with the vehicle; and
transmitting the combined signal.

2. The electronic communication device of claim 1, wherein the information associated with the vehicle comprises at least one of engine data, tire pressure, location information, or speed.

3. The electronic communication device of claim 1, wherein vehicle is a shipping vehicle.

4. The electronic communication device of claim 3, wherein the information associated with the vehicle comprises at least one of location information, vehicle identification, course, speed, cargo information, shipping origin, shipping destination.

5. The electronic communication device of claim 1, wherein the operations further comprise detecting a frequency of the carrier signal by performing a carrier extraction (CAREX) process on the first signal.

6. The electronic communication device of claim 1, wherein adding the second modulation signal to the carrier signal comprises:
modulating a third harmonic signal of the carrier signal of the first signal with data to produce the second modulation signal; and
combining the second modulation signal with the first signal.

7. The electronic communication device of claim 1, wherein adding the second modulation signal to the carrier signal comprises:
   generating a second harmonic signal of the carrier signal and a third harmonic signal of the carrier signal;
   modulating the third harmonic signal with a data signal;
   mixing the modulated third harmonic signal with the second harmonic signal to produce the second modulation signal; and
   combining the second modulation signal with the first signal.

8. The electronic communication device of claim 7, wherein the operations further comprise synchronizing a phase of the second modulation signal with a phase of the first signal.

9. The electronic communication device of claim 1, wherein the first modulation signal is one of phase modulation, frequency modulation, binary phase shift keying, quadrature phase-shift keying, amplitude modulation, or quadrature amplitude modulation.

10. The electronic communication device of claim 5, wherein detecting the frequency of the carrier signal comprises:
    detecting a center frequency of the first signal;
    detecting a frequency of a third signal;
    determining a difference signal between the center frequency of the first signal and the frequency of the third signal;
    modifying the frequency of the third signal based on the difference signal to provide the carrier signal.

11. A method comprising:
    receiving, by a radio system of a vehicle, a first signal from a broadcast signal source, the first signal including a carrier signal modulated with a first modulation signal;
    receiving, by the radio system, information associated with the vehicle;
    encoding, by the radio system, the information in a second modulation signal;
    adding, by the radio system, the second modulation signal to the carrier signal of the first signal to produce a combined signal, wherein the second modulation signal is a transpositional modulation (TM) signal and the first modulation signal is a non-TM signal; and
    transmitting, by the radio system, the combined signal.

12. The method of claim 11, wherein the information associated with the vehicle comprises at least one of engine data, tire pressure, location information, or speed.

13. The method of claim 11, wherein vehicle is a shipping vehicle.

14. The method of claim 13, wherein the information associated with the vehicle comprises at least one of location information, vehicle identification, course, speed, cargo information, shipping origin, shipping destination.

15. The method of claim 11, further comprising detecting a frequency of the carrier signal by performing a carrier extraction (CAREX) process on the first signal.

16. The method of claim 11, wherein adding the second modulation signal to the carrier signal comprises:
    modulating a third harmonic signal of the carrier signal of the first signal with data to produce the second modulation signal; and
    combining the second modulation signal with the first signal.

17. The method of claim 11, wherein adding the second modulation signal to the carrier signal comprises:
    generating a second harmonic signal of the carrier signal and a third harmonic signal of the carrier signal;
    modulating the third harmonic signal with a data signal;
    mixing the modulated third harmonic signal with the second harmonic signal to produce the second modulation signal; and
    combining the second modulation signal with the first signal.

18. The method of claim 17, further comprising synchronizing a phase of the second modulation signal with a phase of the first signal.

19. The method of claim 11, wherein the first modulation signal is one of phase modulation, frequency modulation, binary phase shift keying, quadrature phase-shift keying, amplitude modulation, or quadrature amplitude modulation.

20. The method of claim 15, wherein detecting the frequency of the carrier signal comprises:
    detecting a center frequency of the first signal;
    detecting a frequency of a third signal;
    determining a difference signal between the center frequency of the first signal and the frequency of the third signal;
    modifying the frequency of the third signal based on the difference signal to provide the carrier signal.

* * * * *